(12) United States Patent
Nishio et al.

(10) Patent No.: US 7,833,042 B2
(45) Date of Patent: Nov. 16, 2010

(54) CONNECTOR FOR CONNECTING ELECTRONIC COMPONENT

(75) Inventors: Atsushi Nishio, Tokyo (JP); Shinichi Asano, Tokyo (JP); Yoshihiro Ishikawa, Tokyo (JP); Taketomo Nakane, Tokyo (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 8 days.

(21) Appl. No.: 12/309,833

(22) PCT Filed: Jun. 29, 2007

(86) PCT No.: PCT/JP2007/063152

§ 371 (c)(1),
(2), (4) Date: Jan. 30, 2009

(87) PCT Pub. No.: WO2008/015862

PCT Pub. Date: Jul. 2, 2008

(65) Prior Publication Data

US 2009/0239420 A1    Sep. 24, 2009

(30) Foreign Application Priority Data

Jul. 31, 2006   (JP) ............................. 2006-209182
Nov. 29, 2006   (JP) ............................. 2006-322355
Mar. 30, 2007   (WO) ................. PCT/JP2007/057212

(51) Int. Cl.
   *H01R 13/62*   (2006.01)

(52) U.S. Cl. ...................................... 439/331; 439/160

(58) Field of Classification Search ................ 439/71, 439/326, 331, 157, 155, 160
See application file for complete search history.

(56) References Cited

U.S. PATENT DOCUMENTS 4,699,593 A * 10/1987 Grabbe et al. ................. 439/71

(Continued)

FOREIGN PATENT DOCUMENTS

JP            6-223936 A       8/1994

(Continued)

OTHER PUBLICATIONS

PCT International Search Report, 4 pages, (May 1. 2007).

(Continued)

*Primary Examiner*—Neil Abrams
(74) *Attorney, Agent, or Firm*—The Nath Law Group; Jerald L. Meyer; Brooks Gifford III

(57) ABSTRACT

Provided is a connector for connecting an electronic component, which reduces noise radiation when the electronic component is connected to a substrate through the connector and driven. In a connector (100), a connector main body (130) stores a module (210) inside an opening section (110), and the connector main body is mounted on the substrate by being electrically connected to the stored module (210). The connector main body (130) is provided with a contact lead section (120b) which is lead out to the side of the connector main body (130) to be bonded to a conductor on the substrate. A cover member (160) which opens and closes by turning with a shaft section (161) at the center is pivotally supported on the connector main body (130), and the opening section (110) is covered with the cover member (160) from above. The cover member (160) is provided with a conductive skirt section (170) for covering the contact lead section (120b) from above in a closed state.

7 Claims, 10 Drawing Sheets

U.S. PATENT DOCUMENTS

| | | | |
|---|---|---|---|
| 5,588,847 A * | 12/1996 | Tate | 439/71 |
| 6,234,810 B1 * | 5/2001 | Schnell et al. | 439/76.1 |
| 6,626,683 B2 * | 9/2003 | Lai | 439/73 |
| 7,112,083 B2 * | 9/2006 | Nishio et al. | 439/331 |
| 7,112,102 B2 * | 9/2006 | Masaki et al. | 439/682 |
| 7,128,607 B2 * | 10/2006 | Li | 439/607.36 |
| 7,303,444 B2 * | 12/2007 | Denpouya | 439/660 |
| 7,331,812 B2 * | 2/2008 | Nishio et al. | 439/342 |
| 2005/0048829 A1 * | 3/2005 | Nishio et al. | 439/331 |

FOREIGN PATENT DOCUMENTS

| | | | |
|---|---|---|---|
| JP | 10-253857 A | | 9/1998 |
| JP | 2004-47224 A | | 2/2004 |
| JP | 2005-340076 | * | 1/2005 |
| JP | 2005-190871 A | | 7/2005 |
| JP | 2006-190871 | * | 7/2005 |
| JP | 2005-340076 A | | 12/2005 |
| JP | 2006-79855 | * | 3/2006 |
| JP | 2006-79855 A | | 3/2006 |

OTHER PUBLICATIONS

PCT International Preliminary Report on Patentability, 6 pages, (Feb. 10, 2009).

* cited by examiner

CONNECTOR FOR CONNECTING ELECTRONIC COMPONENT

TECHNICAL FIELD

The present invention relates to an electronic component connector connected with an electronic component such as a module coupled to a signal transmitting member such as an optical waveguide.

BACKGROUND ART

Conventionally, when an electronic component is detachably mounted on a substrate for, for example, maintenance, a method of providing the electronic component on the substrate through a connector is known.

In this case, the connector generally mounts an electronic component on a substrate by detachably and electrically connecting the electronic component and locating and jointing lead parts, which extend in the horizontal direction from lower parts, on contact terminals on the substrate (for example, see Patent Document 1).

Patent Document 1: Japanese Patent Application Laid-Open No. 2005-056626

DISCLOSURE OF INVENTION

Problems to be Solved by the Invention

By the way, accompanying miniaturization of electronic equipment such as mobile telephones, miniaturization of electronic components that are mounted in electronic equipment is promoted and, accompanying this, miniaturization of connectors used to mount electronic components are also realized.

In a configuration where an electronic component is attached to a substrate in this way through a miniaturized connector, there is a case where, for example, a transmitting member, such as an optical waveguide connected with, for example, LCD (Liquid Crystal Display) that transmits a great amount of signals, is connected.

In this case, signals flow at high speed into lead parts connected with substrate contact terminals in a connector, and so, in a configuration locating and jointing the lead parts on the substrate contact terminals, there is a problem that noise is likely to be emitted because lead parts are exposed to the outside.

It is therefore an object of the present invention to provide an electronic component connector emitting little noise when an electronic component is connected with a substrate through a connector and is driven.

Means for Solving the Problem

The electronic component connector according to the present invention employs a configuration including: a connector body that is connected electrically with an accommodated electronic component and that is mounted on a substrate; a lead terminal part that is located in the connector body to lead out sideways of the connector body and that is jointed to a conductor on the substrate; a cover part that is electrically conductive and that covers the connector body from above; and a terminal cover part that is electrically conductive, that is provided in the cover part and that covers the lead terminal part jointed to the conductor from above.

ADVANTAGEOUS EFFECT OF THE INVENTION

The present invention can reduce noise emission when an electronic component is connected with a substrate through a connector and is driven.

BEST MODE FOR CARRYING OUT THE INVENTION

Hereinafter, embodiments of the present invention will be described in detail with reference to the accompanying drawings.

Embodiment 1

Figure 1:
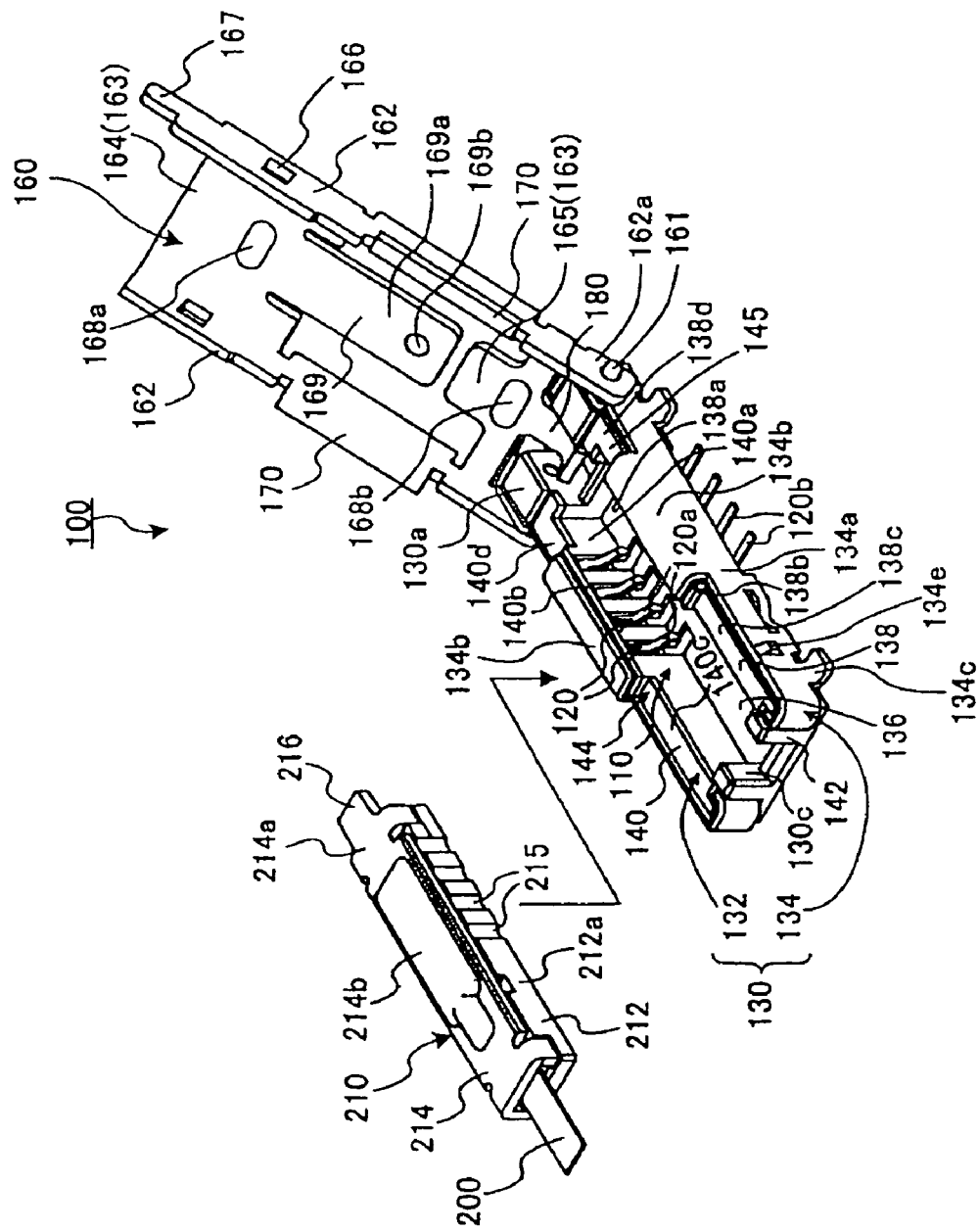
FIG. 1 shows a configuration of an electronic component connector according to Embodiment 1 of the present invention.

FIG. 1 shows a configuration of electronic component connector 100 according to Embodiment 1 of the present invention. A module to which an optical waveguide is attached will be used in the description as an electronic component connected with electronic component connector 100. With the present embodiment, the plane of electronic component connector 100 that is mounted on the substrate is the bottom plane, and the direction in which optical waveguide 200 is attached to module (i.e. electronic component) 210 is the distal end direction. Further, the electronic component is not limited to a module with an optical waveguide and may be a module having an electric wire, flexible cable or optical fiber.

Electronic component connector 100 shown in FIG. 1 detachably connects and accommodates, inside opening part 110 of connector body 130, module 210, to which optical waveguide 200 for guiding optical signals is jointed and which receives light from optical waveguide 200, converts light to a voltage, and outputs the voltage. Electronic component connector 100 shields and protects module 210 accommodated in opening part 110 from electric fields or magnetic fields from the outside by covering module 210 by cover member (cover part) 160 that is pivotally mounted in connector body 130 openably and closably.

Figure 2:
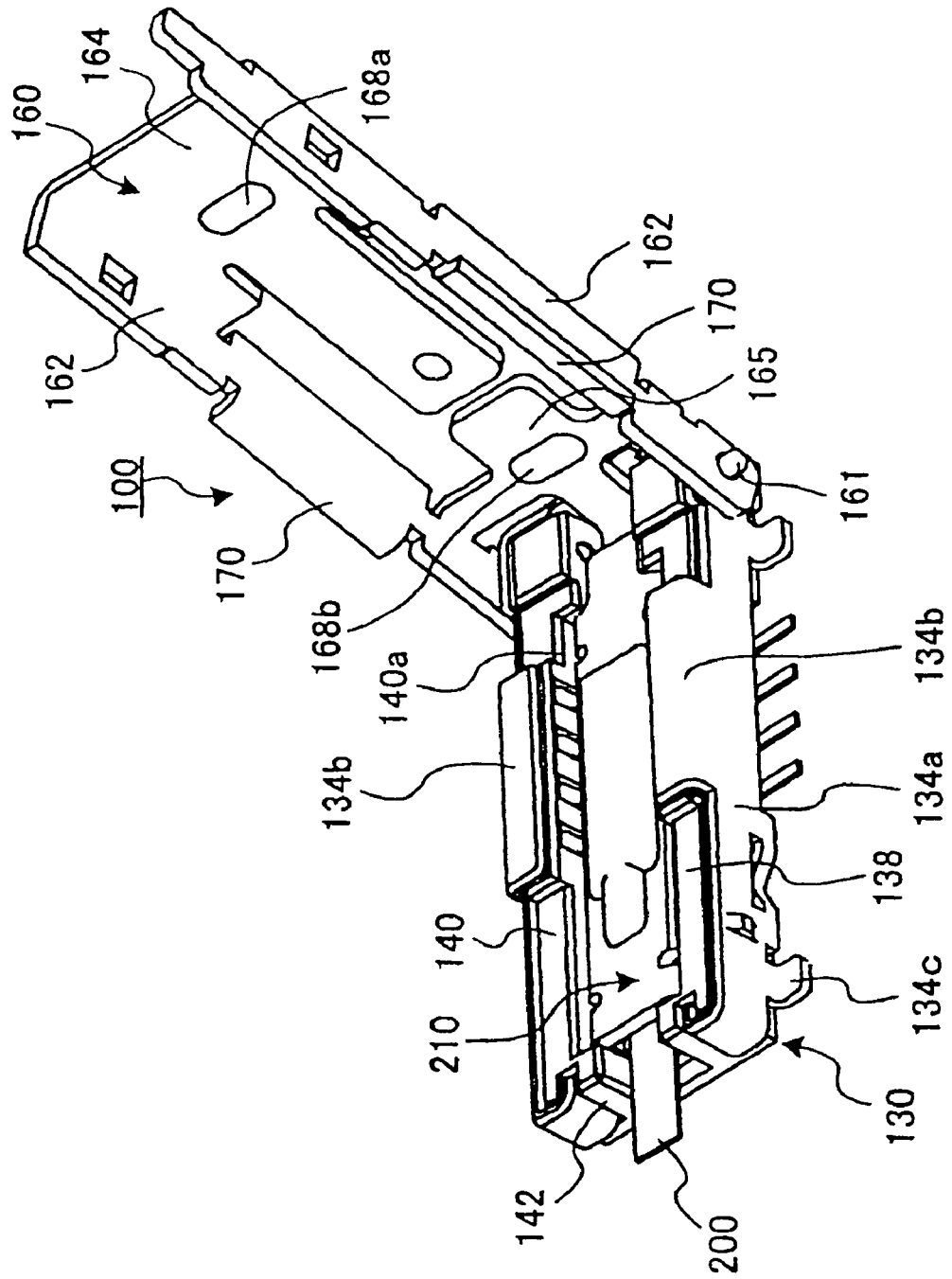
FIG. 2 shows the electronic component connector to which a module is inserted.
Figure 3:
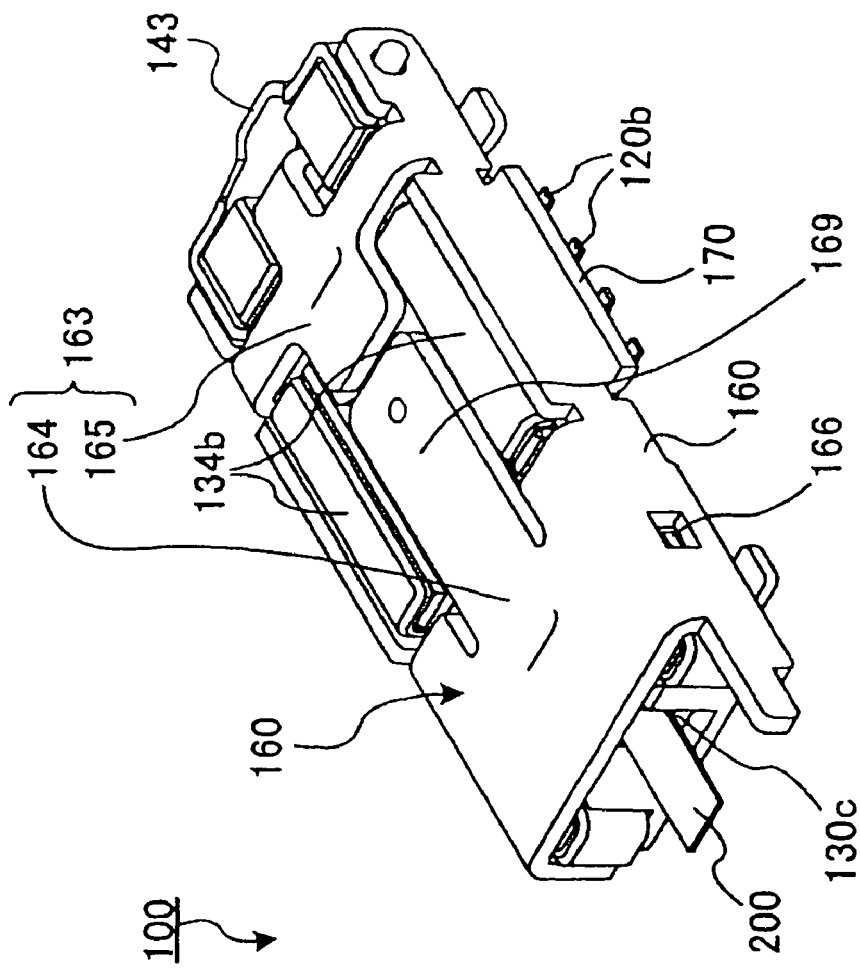
FIG. 3 shows the electronic component connector in a state where the module is connected and accommodated and a cover member is closed.

FIG. 2 shows electronic component connector 100 to which module 210 is inserted, and FIG. 3 shows electronic component connector 100 in a state where module 210 is connected and accommodated and cover member 160 is closed.

First, module 210 to which optical waveguide 200 is attached will be described using FIG. 1.

Module 210 has a rectangular parallelepiped shape here and optical waveguide 200 is attached extending in the longitudinal direction from one end plane of module 210.

To be more specific, module 210 is jointed with one end of optical waveguide 200, and has substrate 212 on which an optical signal processing section (not shown) that carries out optical signal processing through optical waveguide 200 is mounted and module cover 214 (i.e. exterior part) that covers the optical signal processing section (i.e. electronic component body) on substrate 212.

Further, two cores in case of bi-directional optical transmission or one core in case of uni-directional optical transmission are covered by a cladding, and so optical waveguide 200 is formed in a film shape and has flexibility.

Further, when optical waveguide 200 is bi-directional, the optical signal processing section is composed of a light receiving element and light emitting element that receive and emit light through the waveguide and optical processing parts such as a capacitor, amplifier and driver that process and amplify signals from these elements. When optical waveguide 200 attached to module 210 is uni-directional, the optical signal processing section is composed of a light receiving element such as a photo diode or light emitting element and optical processing components such as a capacitor and amplifier. Although this optical signal processing section has an optical conversion function including a function of outputting the signals as voltages (i.e. electrical signals) when optical signals are inputted to module 210, the present invention is not limited to this. For example, the optical signal processing section may be configured with the optical converting function for outputting the electrical signals as optical signals when electrical signals are inputted to the module.

Substrate 212 of module 210 is provided with connection terminal parts (i.e. electrode parts) 215 which are adjacent to the mounting plane (not shown) and which output voltages (i.e. electrical signal) converted by the optical signal processing section to both side planes 212a that extend in the direction in which optical waveguide 200 extends. These connection terminal parts 215 are provided in both side planes 212a so as to be exposed, and, when the mounting plane of substrate 212 is the back plane in this arrangement, connection terminal parts 215 are located inside concave parts that are formed in side planes 212a so as to be open to the front plane and to the side planes of module 210.

When these concave parts are formed orthogonal with respect to the plane portion of film-shaped optical waveguide 200 and are electrically contacted with electronic component connector 100, module 210 is connected by inserting module 210 from the front plane of module 210. In other words, module 210 is connected by inserting module 210 from above in a virtually vertical direction with respect to electronic component connector 100.

Module cover 214 is formed by a conduction member that is electrically conductive, and is formed herein by machining a metal sheet such as a copper sheet into a lid shape, such that the optical signal processing section in which optical waveguide 200 extends from one side plane, is covered from above. Module cover 214 thereby absorbs noise that is generated during the operation of the optical signal processing section.

Further, module cover 214 also has retaining tab part 216 that projects backward from the rear end part of substrate 212. Retaining tab part 216 forms a plate shape that extends backward horizontally from top plane part 214a of module cover 214 and overhangs with respect to substrate 212.

When this retaining tab part 216 is accommodated in opening part 110, retaining tab part 216 is retained from below by ejecting tongue part 180 that is displaced upward, that is, in the opposite direction from the insertion direction, by the rotation of cover member 160.

Further, roof part 214b that projects upward and extends in the longitudinal direction is also formed in the center portion of top plane part 214a of module cover 214. Further, this roof part 214b is the portion to be pressed by ejecting tongue part 180 of cover member 160 when module 210 is inserted to opening part 110 and cover member 160 is closed.

Module 210 configured in this way is fitted in opening part 110 of electronic component connector 100 that opens upward, and thereby connection terminal parts 215 are connected with socket contact parts (contact terminals) 120 of electronic component connector 100.

As shown in FIG. 1 to FIG. 3, electronic component connector 100 has connector body 130 that includes opening part 110 in which module 210 is inserted and fitted (see FIG. 1), and has cover member 160 that is rotatably and pivotally mounted in connector body 130 and that is used to cover module 210 (see FIG. 1) fitted in opening part 110.

As shown in FIG. 1, connector body 130 has housing (housing part) 132 that includes opening part 110, and shield case (shield part) 134 that is located on the periphery of housing 132 and that is used to shield module 210 (see FIG. 1) fitted in opening part 110.

In housing 132, a pair of sidewall parts 138 and 140, which oppose each other across a predetermined gap and which extend in the longitudinal direction, are formed on the top plane of a rectangular, flat plate shaped bottom plane part 136 that opposes the mounting substrate.

Front wall part 142 in which lead-out path 130c is formed is provided between one ends (i.e. referred to as "distal end parts" here) of a pair of these sidewall parts 138 and 140, and stopper part 143 is bridged between the other end parts (i.e. referred to as "proximal end parts" here).

Opening part 110 is defined as a trench shape opening upward by bottom plane part 136, a pair of sidewall parts 138 and 140 and front wall part 142 in this housing 132.

Further, housing 132 is formed with an insulation member that has insulating properties and is made of a synthetic resin here such as plastic that has the insulating properties.

In this housing 132, socket contact parts (i.e. contact terminals) 120 are provided in opposing planes 138a and 140a of both sidewall parts 138 and 140, that is, in the opposing inner wall planes of opening part 110.

Socket contact parts 120 contact connection terminal parts 215 of module 210 (see FIG. 1) when module 210 is fitted in opening part 110 (see FIG. 1).

Socket contact parts 120 are formed by bending long plate-shaped members (not shown) that are electrically conductive. One end parts form contact parts 120a located projecting from the opposing inner wall planes (opposing planes 138a and 140a) of opening part 110. The other end parts form contact lead parts (lead terminal parts) 120b extending virtually parallel to the bottom plane of connector body 130, that is, virtually parallel to bottom plane part 136, to the outside of connector body 130, through a plurality of holes formed in the lower parts of sidewall parts 138 and 140 of housing 132.

In socket contact parts 120, center parts (not shown) that connect contact parts 120a and contact lead parts 120b are embedded in sidewall parts 138 and 140 in the vertical direction, and thereby socket contact parts 120 themselves are fixed to sidewall parts 138 and 140.

When module 210 is inserted from above to opening part 110 of electronic component connector 100, contact parts 120a are guided into the concave parts of substrate 212 in module 210 and are contacted with connection terminal parts 215 (see FIG. 1) of module 210. These contact parts 120a are configured to be urged toward opposing planes 138a and 140a, and so module 210 inserted to opening part 110 is sandwiched and fitted.

Contact lead parts 120b are connected with the conductors of the substrate when located on the substrate on which electronic component connector 100 is mounted.

Further, in the top planes of sidewall parts 138 and 140 of housing 132, top plane portions 138b and 140b in the portions where socket contact parts 120 are provided as shown in FIG. 1 and FIG. 2 are the highest. That is, in sidewall parts 138 and 140, notch parts 144 and 145 are formed in the top plane portions (top plane portions 138c and 140c in the distal end and top plane portions 138d and 140d in the proximal end) other than top plane portions 138b and 140b.

Top plane portions 138c and 140c in the distal end and top plane portions 138d and 140d in the proximal end are in virtually the same height plane, and are at virtually the same height plane as top plane 214a (i.e. back plane) of module 210 fitted in opening part 110 as shown in FIG. 2. That is, module 210 fitted in opening part 110 is lower than the height of the portion where socket contact parts 120 are provided in sidewall parts 138 and 140.

In sidewall parts 138 and 140 of housing 132, socket contact parts 120 are not provided directly below the parts in which notch parts 144 and 145 are formed. Therefore, the height or strength required to provide socket contact parts 120 in housing 132 needs not to be maintained, so that it is possible to decrease the height level accordingly.

That is, in housing 132, the height levels of top planes of top plane portions 138c and 140c in the distal end and top plane portions 138d and 140d in the proximal end are made lower than top plane portions 138b and 140b in portions in which socket contact parts 120 are provided.

A communicating groove that communicates with the distal end of connector body 130 is formed in front wall part 142, and lead-out path 130c of a lead-out part for leading optical waveguide 200 (see FIG. 1) out of module 210 (see FIG. 1) to the outside in the distal end is formed by the communicating groove.

In other words, lead-out path 130c is formed conducting with the distal end of connector body 130 between ends of both sidewall parts 138 and 140 of connector body 130 in the distal end.

According to this configuration, when module 210 (see FIG. 1) is fitted in opening part 110, optical waveguide 200 of module 210 (see FIG. 1) is led outside electronic component connector 100 without being held by electronic component connector 100.

Shield case 134 (see FIG. 1 and FIG. 2) is formed by a conducting member that is electrically conductive, is machined from a metal sheet in this case, is located so as to cover housing 132, and shields module 210 that is accommodated in opening part 110 of housing 132.

To be more specific, as shown in FIG. 1 and FIG. 2, shield case 134 is provided with case body 134a of a rectangular frame shape that is provided so as to surround housing 132 from the sides in the outer peripheral part of housing 132 except the rim part of lead-out path 130c in front wall part 142.

This case body 134a has contact cover parts 134b extending from the upper edge of case body 134a and entirely covers the upside of the portions in which socket contact parts 120 are provided in sidewall parts 138 and 140 of housing 132.

Contact cover parts 134b are electrically conductive and form a plate shape, and are formed continuing to electrically conductive case body 134a and conduct with case body 134a. Contact cover parts 134b cover top plane portions 138b and 140b in the upper portions of socket contact parts 120 that are not covered by cover member 160 when cover member 160 is closed with respect to connector body 130.

This case body 134a is fixed on the mounting substrate through lead parts 134c that are formed extending sideways from the lower edge of case body 134a. Lead parts 134c are fixed electrically connected with the ground part of the substrate on which electronic component connector 100 is mounted. That is, lead parts 134c are fixed electrically connected with the GND land part of the substrate by, for example, soldering.

By this means, shield case 134 formed by a conducting member is electrically connected with the GND line of the substrate through lead parts 134c when electronic component connector 100 is mounted on the substrate. In other words, when electronic component connector 100 is mounted on the substrate, shield case 134 is fixed to the substrate conducting with the GND on the substrate side.

Further, shield case 134 has a shape to match the shape of the peripheral plane of housing 132 located inside, the height level of the upper edge is the highest in the portion where contact cover part 134b is successively formed, that is, in the portion above contact lead parts 120b. In this way, in both sidewall parts of shield case 134, the height levels of upper edges in the distal end portion and the proximal end portion in which contact lead parts 120b are not located below are lower than the upper edge in the portion where contact lead parts 120b are located below.

Module 210 (see FIG. 1) fitted in opening part 110 of connector body 130 configured in this way is inserted from the opening direction (from the upside of connector body 130) of opening part 110 and then is covered by cover member 160, and thereby is fixed electrically connected with connector body 130 (see FIG. 3).

Stopper part 143 is electrically conductive and is formed by bending a plate-shaped material, and is provided to the rear of shaft part 161 so as to bridge in the proximal ends of sidewall parts 138 and 140 of housing 132 in a direction that intersects the direction of rotation of cover member 160.

Stopper part 143 is located in the range of rotation of cover member 160 that is pivotally mounted by shaft part 161 in the proximal end part of shield case 134, and limits the range of rotation of cover member 160.

That is, stopper part 143 abuts on cover member 160 in the proximal end of cover member 160 when cover member 160 is open at a predetermined angle with respect to connector body 130, and cover member 160 is retained in a state opening at the predetermined angle.

Cover member 160 is formed with a conducting member that is electrically conductive, and is formed in this case by machining a metal sheet.

Cover member 160 has a pair of arm parts 162 that are rotatably attached to connector body 130 through shaft part 161, cover top plane part 163 bridging between a pair of arm parts 162, pressing plate part 169 formed in cover top plane part 163, and skirt parts 170 (i.e. terminal covering parts) formed in arm parts 162.

Arm parts 162 form a plate shape and are rotatably attached to both side planes of proximal end parts 130*a* of connector body 130 through shaft part 161 that is orthogonal to one end part 162*a* in the longitudinal direction.

Arm parts 162 are positioned so as to cover both side planes of connector body 130 when cover top plane part 163 is located above notch parts 144 and 145, that is, when cover member 160 is closed, by rotating arm parts 162 around one end part 162*a*.

These arm parts 162 are also provided with locked parts 166 that engage with locking parts 134*e* formed in shield case 134 of connector body 130 when cover member 160 is closed and positioned covering both side planes of connector body 130.

Locking parts 134*e* and locked parts 166 are engaged to fix cover member 160 to connector body 130 (see FIG. 3), and connect and conduct arm parts 162 with shield case 134.

These locking parts (i.e. projecting parts) 134*e* and locked parts (i.e. locking holes) 166 are formed with projecting parts 134*e* projecting in the distal end of both side planes of shield case 134 and engagement holes 166 bored in arm parts 162 and in which projecting parts 134*e* are inserted and engaged. Further, the configurations of the locking parts and the locked parts are not limited to these, and any configuration is possible as long as module 210 (see FIG. 1) inside housing 132 fitted in opening part 110 by cover member 160 is fixed to connector body 130 when cover member 160 is closed. For example, a configuration is possible where projecting parts are provided in a cover member and engagement holes are provided in a sidewall covering part.

Arm parts 162 and shield case 134 may be configured so as to conduct with each other by contact instead of by engagement of parts of arm parts 162 and shield case 134 when cover member 160 is closed with respect to connector body 130. For example, a configuration may be possible where the inner planes of arm parts 162 are in plane contact with the outer plane of shield case 134 when cover member 160 is closed with respect to connector body 130. Further, in arm parts 162, operation part 167 which extends the distal end of one arm part 162 in the axial direction of arm part 162 and which facilitates the opening and closing operations of cover member 160 is provided.

Cover top plane part 163 bridging between arm parts 162 has distal end top plane part 164 bridging across the distal end between a pair of arm parts 162, and proximal end top plane part 165 bridging across the proximal end between a pair of arm parts 162.

When cover member 160 is closed, distal end top plane part 164 is located above notch part 144 in connector body 130, that is, above top plane portions 138*c* and 140*c* in the distal end.

When cover member 160 is closed, proximal end top plane part 165 is located above notch part 145 in connector body 130, that is, above top plane portions 138*d* and 140*d* in the proximal end.

Distal end top plane part 164 and proximal end top plane part 165 limit the movement of module 210 (see FIG. 1) toward the surface, that is, limit the upward movement of connector body 130, in a state where module 210 (see FIG. 1) is fitted in opening part 110 and is electrically connected with connector body 130.

These distal end top plane part 164 and proximal end top plane part 165 are positioned in the same plane, and limbs 168*a* and 168*b* are provided projecting from the interior planes of distal end top plane part 164 and proximal end top plane part 165.

Limbs 168*a* and 168*b* are provided projecting downward from the interior plane of cover member 160 and define the top plane position of module 210 to be accommodated in opening part 110.

To be more specific, limbs 168*a* and 168*b* are formed projecting to the same degree from distal end top plane part 164 and proximal end top plane part 165 and abut on the back plane of module 210 fitted in opening part 110 when cover member 160 is closed to locate module 210 virtually horizontally. In this way, limbs 168*a* and 168*b* are able to locate module 210 in a desirable accommodation position inside opening part 110.

In this distal end top plane part 164, pressing plate part 169 which extends toward proximal end top plane part 165 and tilts downward from the peripheral edge of the proximal end of distal end top plane part 164, is provided.

Pressing plate part 169 is a flexible plate such as a leaf spring, and free end part 169*a* of pressing plate part 169 is located virtually in the center of the module fitted in opening part 110 and presses down (toward the socket contact parts) module 210 (see FIG. 1) fitted in opening part 110 from the top plane (i.e. back plane).

Abutting convex part 169*b* projecting downward in a hemispherical shape (see FIG. 1) is formed on the lower plane of this free end part 169*a*. This abutting convex part 169*b* abuts on the top plane of module 210 inserted to opening part 110, and presses against module 210. Further, abutting convex part 169*b* is formed by embossing downward free end part 169*a* of pressing plate part 160 formed of a long metal sheet.

On the other hand, in proximal end top plane part 165, ejecting tongue part 180 that bends downward extending in the longitudinal direction toward the proximal end of connector body 130 from the edge of the proximal end of proximal end top plane part 165, is provided such that the free end part in the distal end is located in the proximal end of connector body 130 beyond shaft part 161.

This ejecting tongue part 180 is displaced around shaft part 161 following the opening and closing operations of cover member 160, and the free end part in the distal end of ejecting tongue part 180 can move in and out of opening part 110.

That is, when cover member 160 is at a predetermined angle or greater with respect to connector body 130 by rotation in the opening direction, ejecting tongue part 180 projects into opening part 110 and ejects module 210 fitted in opening part 110 towards the opening.

This ejecting tongue part 180 is displaced so as to project into opening part 110 following the rotation operation of cover member 160 in the opening direction with respect to opening part 110, and abuts on the back plane of the retaining tab part of module 210. Cover member 160 is rotated further in the opening direction, and thereby the free end part in the distal end of ejecting tongue part 180 continues pressing against retaining tab part 216 upward from the back plane. Ejecting tongue part 180 is not located inside opening part 110 when cover member 160 limited by a stopper part is positioned at an angle of 90 degrees or greater, with respect to connector body 130. Consequently, ejecting tongue part 180 does not prevent an insertion operation for module 210 upon insertion of module 210 to opening part 110 of connector body 130.

Further, in arm parts 162, skirt parts 170, which cover contact lead parts 120b from above when cover member 160 is closed with respect to connector body 130, are formed. In other words, when cover member 160 rotates in the opening direction with respect to connector body 130 and is placed in an open state, skirt parts 170 of cover member 160 cancel the state where contact lead parts 120b provided in connector body 130 are covered from above.

Skirt parts 170, and, for example, arm parts 162 and also cover top plane part 163 form cover member 160 which is electrically conductive. Further, elements in cover member 160 conduct with each other.

Figure 4:
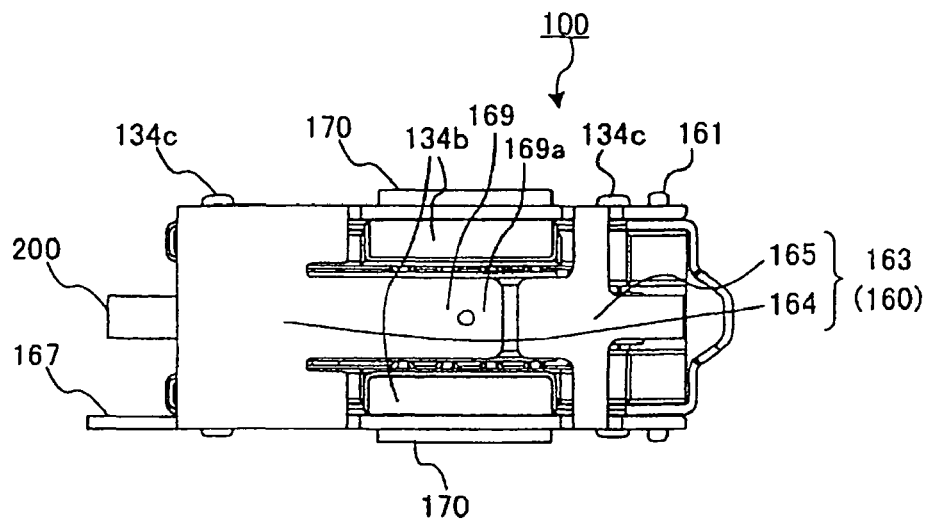
FIG. 4 is a plan view of the electronic component connector shown in FIG. 3.
Figure 5:
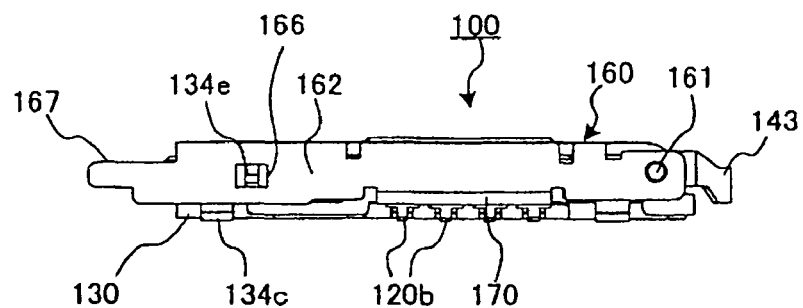
FIG. 5 is a side view of the electronic component connector shown in FIG. 3.
Figure 6:
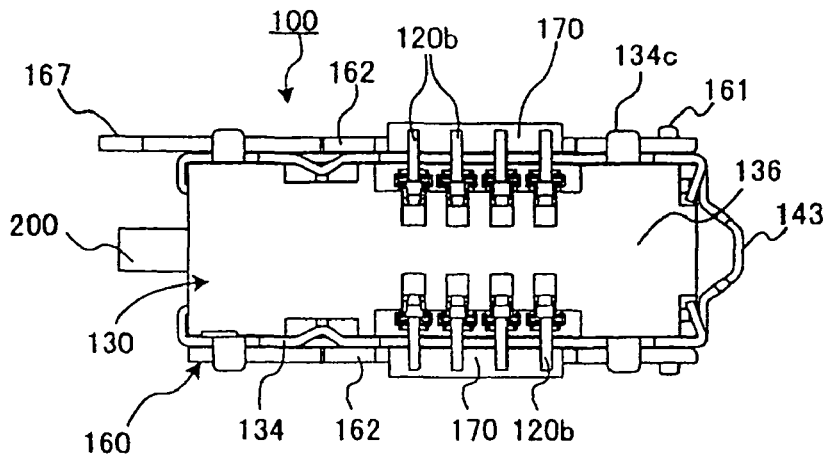
FIG. 6 is a bottom view of the electronic component connector shown in FIG. 3.
Figure 7:
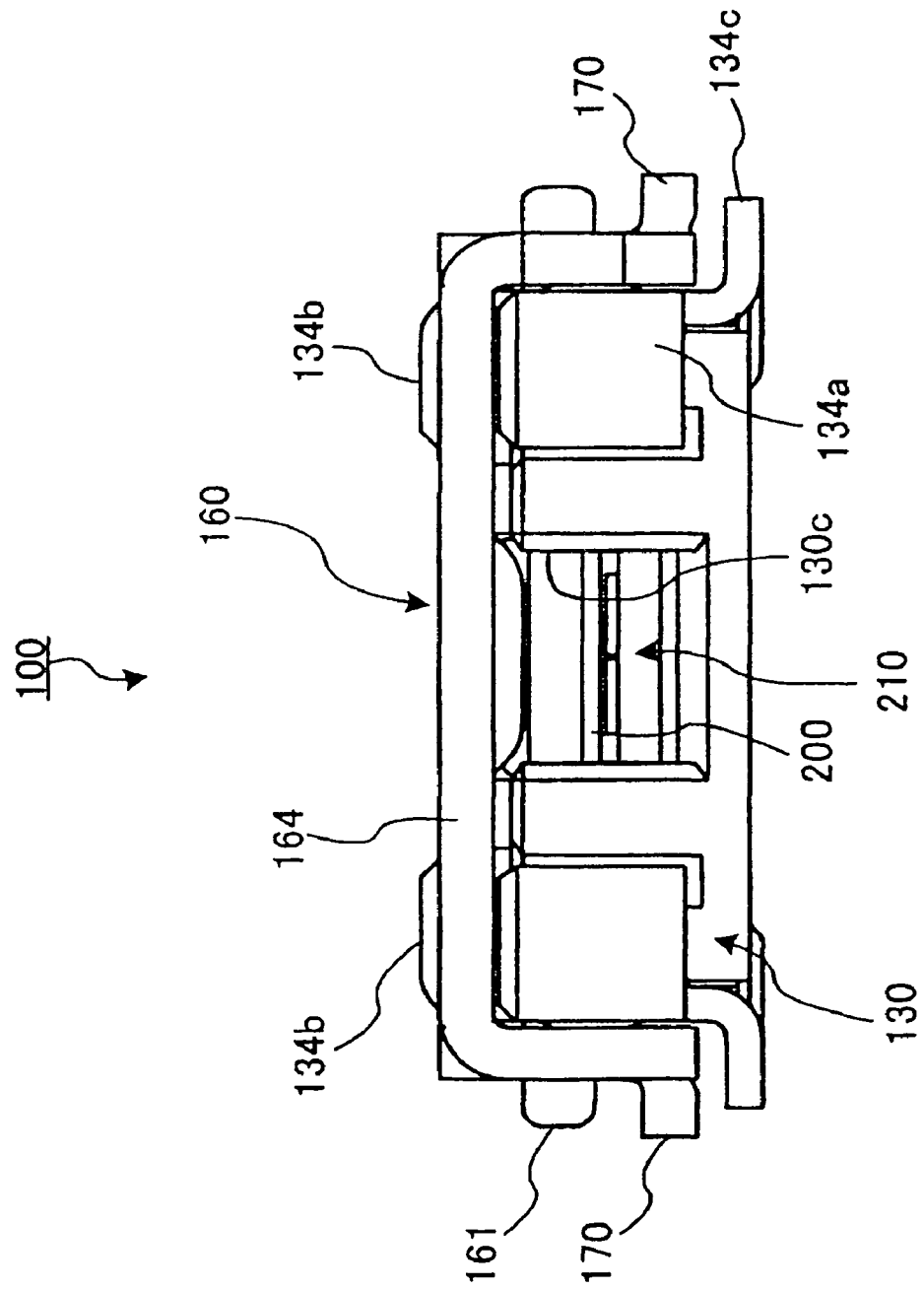
FIG. 7 is a front view of the electronic component connector shown in FIG. 3.

FIG. 4 is a plan view of electronic component connector 100 shown in FIG. 3, FIG. 5 is a side view of electronic component connector 100, FIG. 6 is a bottom view of electronic component connector 100 and FIG. 7 is a front view of electronic component connector 100.

Further, these FIG. 4 to FIG. 7 show electronic component connector 100 in a state where module 210 is connected and fixed by accommodating module 210 inside and closing cover member 160.

As shown in FIG. 1 to FIG. 7, skirt parts 170 are formed in the plate shape extending virtually horizontally to both sides (i.e. left and right directions) from the lower edges of a pair of arm parts 162. Here, skirt parts 170 are formed so as to extend in the longitudinal direction bending from the lower edges of arm parts 162, which are electrically conductive and are formed of metal sheets, in a direction orthogonal to arm parts 162.

As shown in FIG. 3 to FIG. 7, skirt parts 170 are located close directly above contact lead parts 120b when cover member 160 is closed with respect to connector body 130.

For example, skirt parts 170 are formed in arm parts 162 so as to be located about 0.2 and 0.25 above contact lead parts 120b when cover member 160 is in a closed state. In this way, skirt parts 170 are members which are the closest to contact lead parts 120b jointed on the substrate and which are electrically conductive.

Skirt parts 170 are longer than the length in the longitudinal direction in which contact lead parts 120b included in connector body 130 are located. The length extending to both sides (i.e. left and right directions) from a pair of arm parts 162 is longer than the length in the direction in which contact lead parts 120 extend. Here, as shown in FIG. 3 to FIG. 6, the length of skirt part 170 in the longitudinal direction extends further toward the proximal end and distal end beyond contact lead parts 120b located in the proximal end and distal end among a plurality of contact lead parts 120b located below.

By this means, when cover member 160 is closed with respect to connector body 130, contact lead parts 120b cannot been seen when viewed from above as shown in FIG. 4 and skirt parts 170 completely cover contact lead parts 120b.

Further, skirt parts 170 are provided extending in the virtually horizontal direction to the sideways from arm parts 162, and so are located evenly close to the entire plane exposing to the upside of contact lead parts 120b with respect to contact lead parts 120b located directly below skirt parts 170.

Although skirt parts 170 are formed in a virtually horizontal plate shapes that are orthogonal to arm parts 162, the present invention is not limited to this. Skirt parts 170 may be formed in any manner as long as skirt parts 170 cover contact lead parts 120b from above when cover member 160 is closed. For example, skirt parts 170 may be configured with horizontal plate parts that extend virtually horizontally from the lower edges of arm parts 162 and vertical plate parts that extend orthogonally downward from the distal ends of the horizontal plate parts.

To be more specific, the horizontal plate parts are bent in the distal end to form the vertical plate parts, and, when cover member 160 is closed with respect to connector body 130, contact lead parts 120b are covered from above by the horizontal plate parts, and the distal end parts of contact lead parts 120b are covered by the horizontal plate parts. At this time, the horizontal plate parts and the vertical plate parts are both located close to contact lead parts 120b, and do not touch contact lead parts 120b.

When miniaturized module 210 is installed to an electronic equipment or the like through electronic component connector 100 and used, electromagnetic noise that generates electromagnetic interference (EMI) with respect to another component or equipment that is near the electronic equipment, readily occurs due to the signal current when the operating frequency of the signal flowing to and from module 250 increases.

Skirt parts 170 prevent the EMI-generating electromagnetic noise from being generated in contact lead parts 120b. That is, electronic component connector 100 makes it possible to absorb EMI generated in contact lead parts 120b and flow the EMI into the ground of the mounted substrate through, for example, arm parts 162, shaft part 161, shield case 134 and lead parts 134c.

Here, a method of connecting an electronic component connector and a module with an optical waveguide will be described.

As shown in FIG. 1, cover member 160 of electronic component connector 100 is opened, and module 210, to which optical waveguide 200 is connected from the upside of connector body 130, is inserted from the front side of module 210, that is, from the substrate side, into trench-shaped opening part 110 of connector body 130 that is exposed upward. When cover member 160 is open, the rotation position of cover member 160 is limited by stopper part 143 in a state where cover member 160 opens 90 degrees or greater with respect to connector body 130. Consequently, when module 210 is inserted to opening part 110, cover member 160 is prevented from opening too much and falling over such that the backside is directed upward to contact other electronic components.

When module 210 is inserted to opening part 110, contact parts 120a of socket contact parts 120 of connector body 130 are guided into contact with corresponding concave connection terminal parts (i.e. electrode parts) 215, on both side planes of substrate 212 in module 210. Connection terminal parts 215 and contact parts 120a contact with each other, and module 210 is fitted in opening part 110.

At this point, contact parts 120a project inward from both sidewall parts 138 and 140 of trench-shaped opening part 110. Therefore, when contact parts 120a are guided into the inner plane parts of both sidewalls that open downward (i.e. insertion direction) in concave connection terminal parts 215 and contact connection terminal parts 215 of substrate 212 of module 210, contact parts 120a contact in a state of elastic deformation in the proximal end and are urged against connection terminal parts 215. Consequently, contact parts 120a are fit sandwiching module 210 inside opening part 110 and are reliably contacted with connection terminal parts 215 of module 210.

After module 210 is fitted in opening part 110 of connector body 130, cover member 160 is closed, distal end top plane part 164 is located above notch part 144, and projecting parts 134e of shield case 134 are engaged with engagement holes 166 of cover member 160, and thereby distal end top plane part 164 is fixed in connector body 130.

Further, module 210 may be fitted in opening part 110 by tentatively inserting module 210 to opening part 110, closing cover member 160 and pressing against cover member 160. That is, after connection terminal parts 215 of module 210 are located on contact parts 120a, contact parts 120a are located in concave insulating parts of connection terminal parts 215, and cover member 160 is closed, module 210 is inserted inside opening part 110.

As shown in FIG. 3 to FIG. 7, cover member 160 is thus placed in a closed state, that is, in a collapsed state, with respect to connector body 130 so as to cover opening part 110, and thereby module 210 is accommodated inside electronic component connector 100.

At this time, distal end top plane part 164 is located above the back plane of module 210 in the distal end, and proximal end top plane part 165 is located above the back plane of module 210 in the proximal end.

Further, free end part 169a of pressing plate part 169 extending from distal end top plane part 164 to the proximal end part of cover member 160 presses against practically the center part of the back plane of module 210.

In this way, distal end top plane part 164 is thus located above module 210 in the distal end, thereby preventing movement in the direction away from opening part 110 of module 250, that is, from connector body 130.

Figure 9:
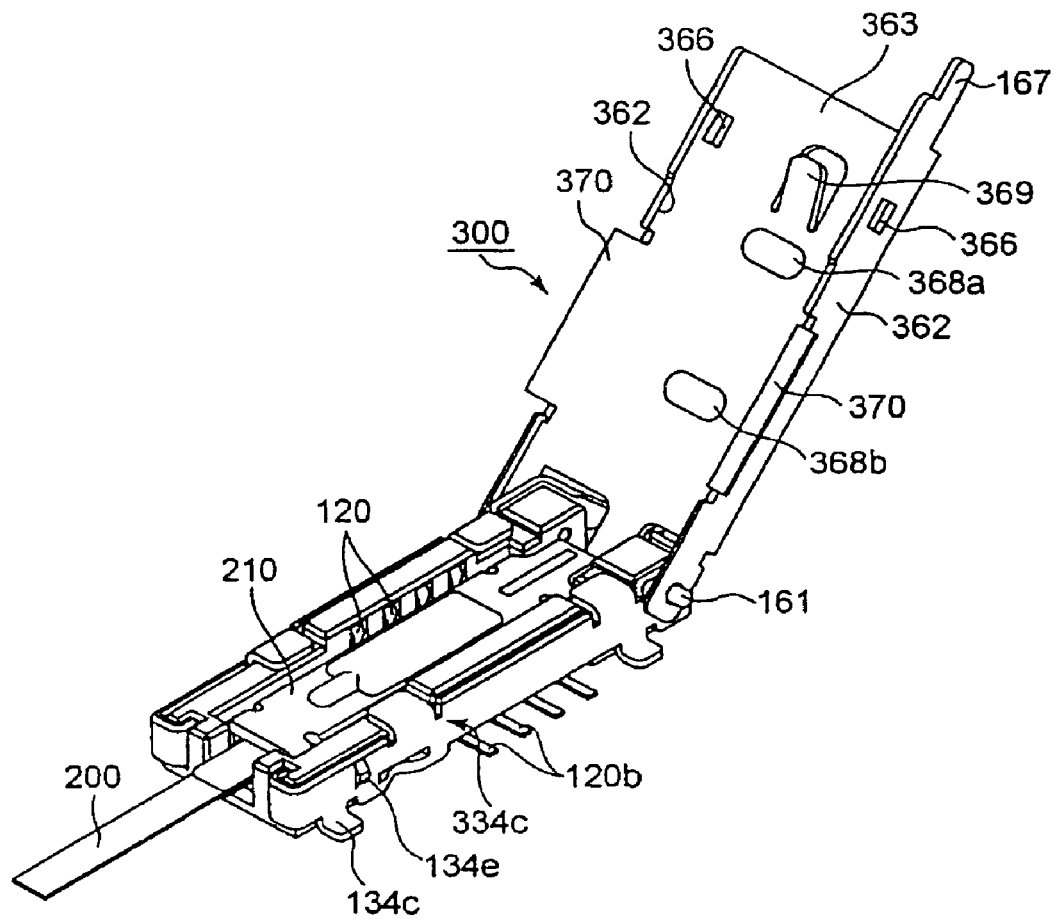
FIG. 9 shows the electronic component connector to which the module is inserted.

Further, pressing plate part 169 extends from distal end top plane part 164 toward the proximal end part of cover member 160 tilting downward, and consequently when module 210 is fitted in opening part 110 and cover member 160 is closed, virtually the center portion of the back plane of module 210 is pressed (see FIG. 9). This pressing force is transmitted to the entire parts of contact between contact parts 120a of socket contact parts 120 and connection terminal parts 215 of module 210.

Further, in the backplane of module 210, the back plane portions in the distal end and the proximal end sandwiching the center portion pressed by pressing plate part 169, are each pressed by limbs 168a and 168b that project to the same degree on the interior planes of distal end top plane part 164 and proximal end top plane part 165.

Consequently, module 210 is prevented from moving in the direction away from opening part 110, that is, from connector body 130, and is accommodated inside opening part 110 virtually horizontally without tilting in the longitudinal direction.

Accordingly, only by closing cover member 160, module 210 is reliably fixed electrically connected in parts contacting connector body 130 without touching or retaining optical waveguide 200.

Shock such as vibration added to the mounting substrate on which electronic component connector 100 is mounted can therefore be prevented from causing slight sliding due to drift or disconnection in the position of contact with module 210. That is, in the structure in which electronic component connector 100 of the present embodiment is connected with module 210 with an optical waveguide, module 210 is not drifted with respect to electronic component connector 100, so that electrical signals can be transmitted smoothly.

Further, in electronic component connector 100, a notch is made in the upper portion of connector body 130 except the portion in which socket contact parts 120 are located, and distal end top plane part 164 and proximal end top plane part 165 of cover member 160 are located in notch parts 144 and 145.

Therefore, the height of top plane part 163 of cover member 160 including distal end top plane part 164 and proximal end top plane part 165 located above notch parts 144 and 145, can be made equal to the height of socket contact parts 120. The height of electronic component connector 100 can be minimized, thereby realizing a lower profile.

In electronic component connector 100 as shown in FIG. 3 to FIG. 7, module 210 inside opening part 110 is fixed in a state where top plane 214a of module cover 214 that is electrically conductive abuts on abutting convex part 169b on pressing plate part 169 that is electrically conductive.

At this point, in cover member 160 that has pressing plate part 169, engagement holes 166 provided in arm parts 162 engage with projecting parts 134e of shield case 134. By this means, cover member 160 and shield case 134 are in contact with each other through the engagement of engagement holes 166 with projecting parts 134e, and are electrically connected.

That is, in the state where module 210 is installed in electronic component connector 100, module cover 214 conducts with shield case 134 of connector body 130 through cover member 160. Further, connector body 130 is jointed to the GND land part of the substrate on which connector body 130 is mounted through lead parts 134c of shield case 134, and thereby is mounted on the substrate.

Cover member 160 is closed and engagement holes 166 are engaged with projecting parts 134e, so that module 210 is electrically connected and conducts with the ground part of the substrate through module cover 214, cover member 160 including pressing plate part 169 and engagement holes 166 and shield case 134 including projecting parts 134e and lead parts 134c.

Module cover 214 of module 210 is thereby connected with the GND land part of the substrate and conducts with the ground part when the connector body is mounted on the substrate.

Accordingly, when module 210 connected with the electronic component connector is operated, noise that is generated by this operation is absorbed by module cover 214 and transmitted to the ground part of the substrate through cover member 160 and shield case 134. Consequently, noise leakage during the operation of module 210 can be prevented.

At this time, it is not necessary to additionally provide noise-prevention wiring required to prevent noise leakage during the operation of module 210, so that noise leakage can be prevented only by mounting the connector body on the substrate by fixing lead parts 134c of shield case 134 being connected with the ground part.

Further, when module 210 is inserted to opening part 110 and cover member 160 falls down to close in electronic component connector 100, skirt parts 170 are located close directly above contact lead parts 120b of connector body 130.

Consequently, in a state where cover member 160 falls down and opening part 110 of connector body 130 is not closed, contact lead parts 120b of connector body 130 are exposed to the outside, particularly, upward, so that the operator can check contact lead parts 120b.

In this way, in a state where cover member 160 is open from connector body 130, contact lead parts 120b and a pat on the substrate can be jointed at ease and electronic component connector 100 can be mounted on the substrate at ease.

When module 210 of connector body 130 is covered by cover member 160, contact lead parts 120b projecting to the left and right from the lateral sides of connector body 130 are covered from above by skirt parts 170 located in the closest position as an electronically conductive member.

In this configuration, even when high-speed signals flow into contact lead parts 120b during the operation of module 210 and noise is emitted from contact lead parts 120b, the noise is absorbed by skirt parts 170 located close directly above contact lead parts 120b. At this point, when viewed from the above, contact lead parts 120b are covered by skirt parts 170 and cannot be seen, and are completely covered from above.

That is, skirt parts 170 are provided in cover member 160, and so are grounded to the GND land of the mounting substrate through cover member 160 and lead parts 134c of shield case 134 of connector body 130.

Consequently, even when, in electronic component connector 100, high-speed signals flow into contact lead parts 120b connected with the mounting substrate and noise is emitted from contact lead parts 120b, the noise is grounded to the GND land of the substrate through skirt parts 170. Consequently, the noise emitted from contact lead parts 120b is absorbed by skirt parts 170, and shielded and reduced.

That is, skirt parts 170 can thereby prevent electromagnetic interference (EMI) due to the emission and propagation of electromagnetic noise (i.e. electromagnetic waves) leaking from contact lead parts 120b Further, the periphery and top plane 214a of module 210 accommodated inside opening part 110 of electronic component connector 100 are covered by shield case 134 of connector body 130 and cover member 160, respectively.

To be more specific, in electronic component connector 100, distal end top plane part 164 of cover member 160 covers from above distal end top plane portions 138c and 140c exposing the upside of housing 132 that is made of a resin, that is, that has insulating properties, and that accommodates module 210. Proximal end top plane part 165 covers from above proximal end top plane portions 138d and 140d exposing the upside of housing 132. Top plane portions 138b and 140b in portions where socket contact parts 120 are located in housing 132, are covered by contact cover parts 134b extending from shield case 134.

Further, top plane 214a of module 210 is covered by distal end top plane part 164, pressing plate part 169 and proximal end top plane part 165.

Contact lead parts 120b exposing to the outside are covered by skirt parts 170 and module 210 connected electrically inside electronic component connector 100 is covered almost entirely by electrically conductive members.

Consequently, electronic component connector 100 with which module 210 is connected makes it possible to prevent, for example, EMI as much as possible.

When module 210 is removed from electronic component 100 in which module 210 is accommodated, module 210 can be detached from electronic component connector 100 only by rotating cover member 160 in the opening direction.

When removed from electronic component connector 100, retaining tab part 216 of module cover 214 abuts on ejecting tongue part 180 of cover member 160 until module 210 is detached from opening part 110.

By this means, until immediately before module 210 is ejected and is separated completely from electronic component connector 100, module 210 can be grounded to the GND land of the substrate through shield case 134 of cover member 160. Consequently, if a static charge is generated when module 210 is removed, the static charge can thereby be conducted to the ground part of the substrate until the state of connection of module 210 is completely cancelled.

Embodiment 2

Figure 8:
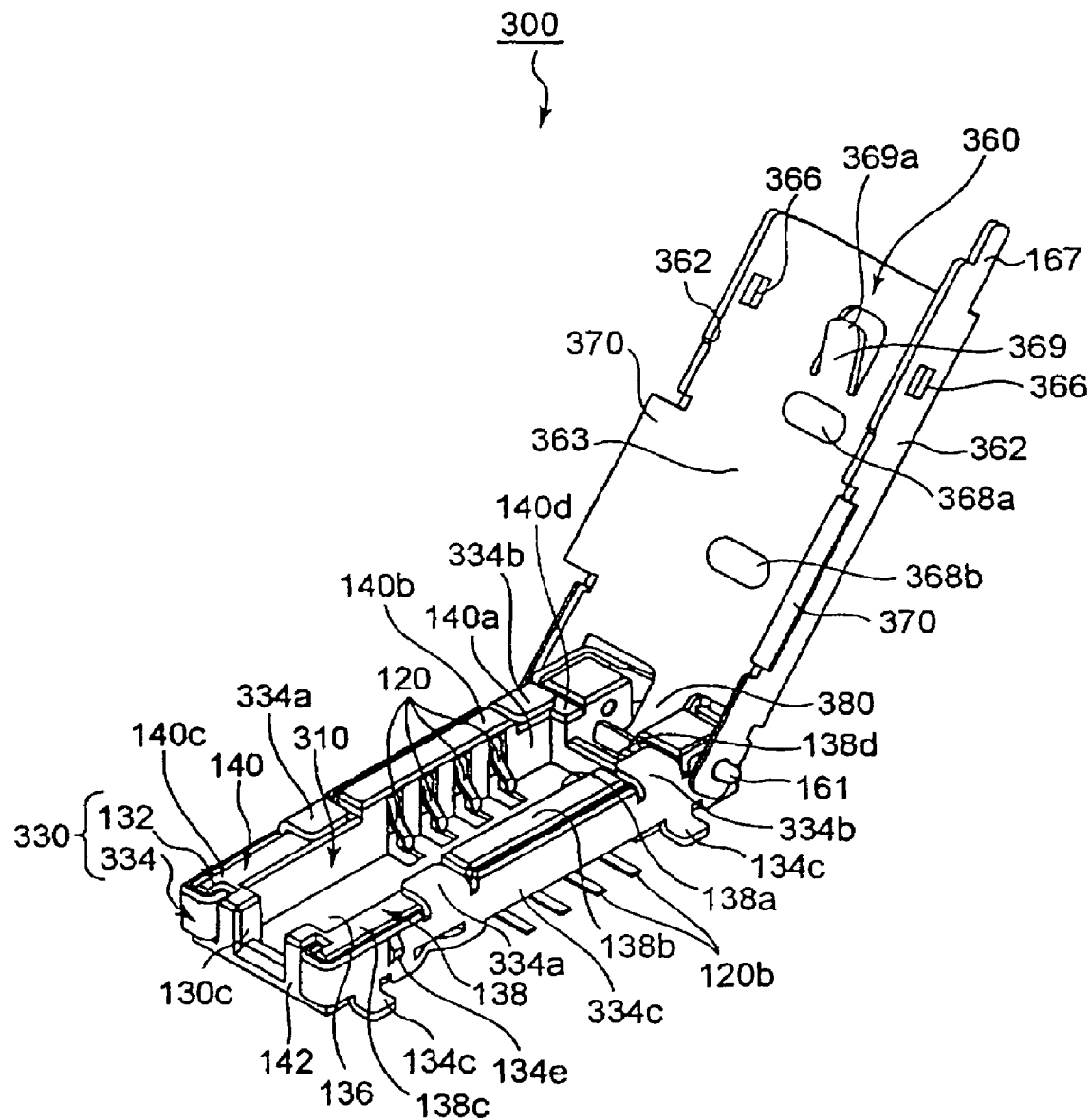
FIG. 8 shows the configuration of the electronic component connector according to Embodiment 2 of the present invention.
Figure 10:
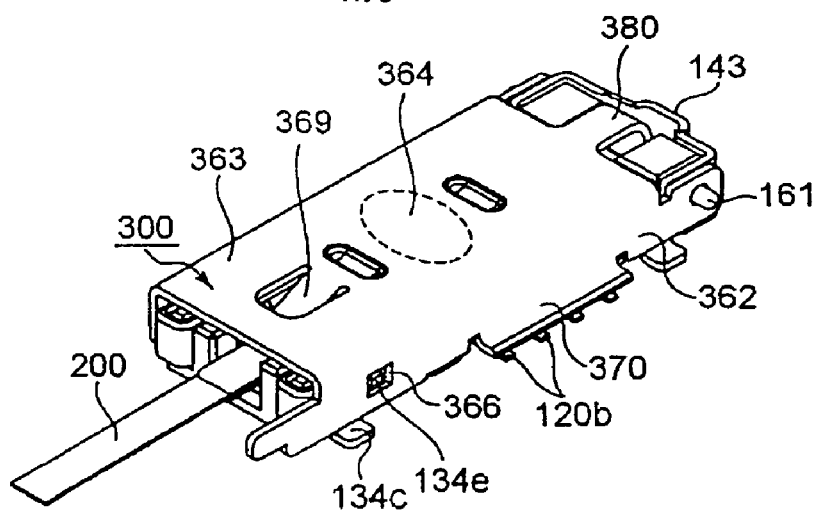
FIG. 10 shows the electronic component connector in a state where the module is connected and a cover member is closed.

FIG. 8 shows a configuration of the electronic component connector according to Embodiment 2 of the present invention, FIG. 9 shows the electronic component connector to which a module is inserted and FIG. 10 shows the electronic component connector that connects with the module and closes a cover member.

Similar to electronic component connector 100 of Embodiment 1, electronic component connector 300 of Embodiment 2 detachably connects and accommodates module 210 to which, an electronic component, optical waveguide 200, is attached, inside opening part 310 of connector body 330 (see FIG. 9).

Electronic component connector 300 shields and protects module 210 from electric fields or magnetic fields from the outside by covering module 210 accommodated in opening part 310 by cover member (cover portion) 360 pivotally mounted in connector body 330 openably and closably.

Further, similar to electronic component connector 100 of Embodiment 1, module 210 is inserted to opening part 310 of electronic component 300 to fit in electronic component connector 300. By this means, connection terminal parts 215 of module 210 (see FIG. 1) are connected with socket contact parts (i.e. contact terminal) of electronic component connector 300.

This electronic component connector 300 differs from electronic component connector 100 only in the configuration of cover member 160 of electronic component connector 100 and the configuration of shield case (shield part) 134 of connector body 110, and the rest of configurations are the same. Consequently, the details of the same configuration in electronic component connector 300 will be assigned the same names and same reference numerals, and description thereof will be omitted.

Similar to Embodiment 1, with Embodiment 2, the plane of the electronic-component connector 100 that is mounted on the substrate is the bottom plane and the direction in which optical waveguide 200 is attached to module (i.e. electronic component) 210 is the direction of the distal end. Further, the electronic component is not limited to the module with the optical waveguide and may be a module having an electric wire, flexible cable or optical fiber.

In electronic component connector 300 shown in FIG. 8, cover member 360 that has skirt parts (i.e. terminal cover parts) 370 with the same function as skirt parts 170 is rotatably and pivotally mounted in connector body 330 having opening part 310 in which module 210 is fitted (see FIG. 9). This cover member 360 covers module 210 (see FIG. 9) inserted to opening part 310 and fitted in connector body 330 inside opening part 310.

As shown in FIG. 8, connector body 330 has housing (housing part) 132 having opening part 310 and shield case (shield part) 334 that shields module 210 (see FIG. 9) fitted in opening part 310.

Housing 132 is the same as housing 132 of electronic component connector 100 in Embodiment 1. That is, front wall part 142 in which lead-out path 130c is formed is provided between distal end parts of a pair of sidewall parts 138 and 140, and stopper part 143 (see FIG. 10) is bridged between the proximal end parts.

Similar to opening part 110, opening part 310 communicates with lead-out path 130c in the distal end and is defined as an upward-opening trench shape by bottom plane part 136, a pair of sidewall parts 138 and 140 and front wall part 142 of this housing 132.

Further, socket contact parts (i.e. contact terminals) 120 are provided in opposing planes 138a and 140a of both sidewall parts 138 and 140, that is, provided in the opposing inner wall planes of opening part 110.

Attachment of socket contact parts 120 to housing 132 and connection of socket contact parts 120 with module 210 inserted to opening part 310 of connector body 330 in electronic component connector 300 are the same as in electronic component connector 100, and description thereof will be omitted.

Similar to Embodiment 1, a communicating groove that communicates with the distal end of connector body 330 is formed in front wall part 142, and lead-out path 130c of a lead-out part for leading optical waveguide 200 (see FIG. 9) out of module 210 (see FIG. 9) to the outside is formed by the communicating groove.

Similar to shield case 134 of Embodiment 1, shield case 334 is formed by a conducting member that is electrically conductive and is machined from a metal sheet. This shield case 334 is located so as to cover housing 132 from the outer periphery and shields module 210 to be accommodated in opening part 310 of housing 132.

This shield case 334 differs from shield case 134 in having no contact cover parts 134a and 134b covering top plane portions 138b and 140b in upper parts of socket contact parts 120 and additionally having upper plate parts 334a and 334b.

That is, as shown in FIG. 8 to FIG. 10, shield case 334 is provided with same rectangular-frame shaped case body 334c as case body 134a in the outer peripheral part of housing 132 except the rim part of lead-out path 130c in front wall part 142.

Case body 334c surrounds housing 132 from lateral sides and is fixed to the mounting substrate through lead parts 134c formed extending sideways from the lower edges. Similar to shield case 134, when electronic component connector 300 is mounted on the substrate through lead parts 134c, shield case 334 is fixed to the substrate conducted with the GND of the substrate side.

Upper plate parts 334a and 334b are formed in the upper edges of this case body 334c, and these upper plate parts 334a and 334b are located on both sides of top plane portions 138b and 140b of a pair of sidewall parts 138 and 140 of housing 132.

These upper plate parts 334a and 334b cover top plane portions 138c and 140c of the height level lower than top plane portions 138b and 140b in the distal end and parts of top plane portions 138d and 140d in the proximal end.

Further, when connector body 330 is assembled by fitting shield case 334 from the top plane of housing 132, upper plate parts 334a and 334b abut on top plane portions 138c and 140c in the distal end and top plane portions 138d and 140d in the proximal end. By this means, in the assembly operation of connector body 330, it is possible to prevent shield case 334 from being fitted in housing 132 more than necessary and facilitate the assembly operation.

Module 210 (see FIG. 9) fitted in opening part 310 of connector body 330 configured in this way is inserted from the opening direction of opening part 310 (from the upside of connector body 330), then is covered by cover member 360, and is fixed electrically connected with connector body 330.

When cover member 360 opens a predetermined angle with respect to connector body 330, stopper part 143 of this connector body 330 in the proximal end abuts on cover member 360 in the proximal end part and retains cover member 360 in a state in which cover member 360 is open at a predetermined angle.

Cover member 360 has the same basic configuration as cover member 160 but differs from cover member 160 in the position of pressing plate part 369 and in having additionally suctioned plane 364 that is wider than the size of the opening of the suction nozzle of a mounter, in the center portion of the top plane.

Therefore, the same configuration of cover member 360 as cover member 160 in Embodiment 1 has the same function, and so will be assigned the same names and same reference numerals and description thereof will be omitted.

That is, cover member 360 is formed with a conducting member that is electrically conductive such as a metal sheet, and has: a pair of arm parts 362 rotatably attached to connector body 330 through shaft part 161; cover top plane part 363 bridging between a pair of arm parts 362; pressing plate part 369 formed in cover top plane part 363; and skirt parts 370 formed in arm parts 362.

Arm parts 362 are the same as arm parts 162 and are rotatably attached to connector body 330 through one end 362a of shaft part 161. Arm parts 362 are rotated around shaft part 161 and closed to cover both side planes of connector body 330.

Similar to cover member 160 of Embodiment 1, these arm parts 362 are provided with locked parts 366 that engage with locking parts 134e formed in shield case 334 of connector body 330 when cover member 360 is closed and located covering both side planes of connector body 330.

That is, cover member 360 is provided with locked parts (i.e. engaged parts) 366 that detachably engage with locking parts (i.e. engaging parts) 134e of connector body 330 when covering connector body 330. Locking parts 134e and locked parts 366 are the same as locking parts 134e and locked parts 166, and detailed description thereof will be omitted.

That is, locking parts 134e and locked parts 366 are engaged to fix cover member 360 to connector body 330 (see FIG. 10), and connect and conduct arm parts 362 with shield case 334. Further, arm part 362 is provided with operation member 167 similar to arm part 162.

When cover member 360 is closed with respect to connector body 330, cover top plane part 363 is located above connector body 330, that is, above housing 132. Further, similar to cover top plane part 163, cover top plane part 363 limits the movement of module 210 fitted in opening part 310 (see FIG. 9) toward the surface, that is, the upward movement from connector body 330.

This cover top plane part 363 is formed in a plate shape covering the top plane of connector body 330, to be more specific, the entire top plane of housing 132.

As shown in FIG. 10, in cover top plane part 363, suctioned plane part 364 which is a plane area wider than the size of the opening of the suction nozzle of the mounter, in virtually a center portion in cover top plane part 363.

Suctioned plane part 364 is a portion suctioned by the suction nozzle of a mounting apparatus such as the mounter when electronic component connector 300 is mounted on the substrate using the mounting apparatus such as the mounter.

In the interior plane of cover top plane part 363, that is, in the plane opposing the top plane of module 210 accommodated inside electronic component connector 300, limbs 368a and 368b project sandwiching the center portion, as shown in FIG. 8 and FIG. 9.

Limbs 368a and 368b are provided projecting below from the interior plane of cover member 360 and define the top plane position of module 210 accommodated in opening part 310.

To be more specific, limbs 368a and 368b are formed projecting to the same degree from the interior plane of cover top plane part 363 and have the same function as limbs 168a and 168b of Embodiment 1. That is, when cover member 160 is closed, limbs 368a and 368b abut on the back plane of module 210 fitted in opening part 110 and locate module 210 virtually horizontally. In this way, limbs 368a and 368b are able to locate module 210 in a desirable accommodation location inside opening part 310.

In cover top plane part 363, pressing plate part 369 having the same function as pressing plate part 169 is provided extending toward the distal end and tilting downward.

Pressing plate part 369 is formed integrally in cover top plane part 360 and is a flexible plate such as a leaf spring. Free end part 369a of pressing plate part 369 presses down (toward the socket contact parts) electrically conductive module cover 214 of module 210 fitted in opening part 310 from the top plane (i.e. back plane) of module cover 214. To be more specific, in the interior plane of cover top plane part 363, pressing plate part 369 is formed tilting downward to the distal end from the portion adjacent with respect to limb 368a in the distal end. Here, pressing plate part 369 is formed by making a notch in and bending a portion downward in the distal end further than a portion where limb 368b is formed, and has the length shorter than pressing plate part 169 of Embodiment 1. When module 210 is accommodated in opening part 310, free end part 369a in the distal end of this pressing plate part 369 abuts on the distal end part of module cover 214 of module 210.

In the proximal end side edge of cover top plane part 363, ejecting tongue part 380 which is the same as ejecting tongue part 180 of Embodiment 1 is formed.

That is, ejecting tongue part 380 is formed with a plate-shaped member having almost the same width as the width of opening part 310 and is configured to extend from the center of the proximal end side edge of cover top plane part 363 to the proximal end of connector body 330 and bend downward in a position adjacent to the proximal end of arm parts 162. By this means, the free end part in the distal end of ejecting tongue part 380 is located in the proximal end of connector body 330 by shaft part 161.

This ejecting tongue part 380 is displaced around shaft part 161 following the opening and closing operations of cover member 360, and the free end part in the distal end thereof can move in and out of opening part 310.

That is, when cover member 360 comes at a predetermined angle or greater with respect to connector body 330 by rotation in the opening direction, ejecting tongue part 380 projects into opening part 310 and ejects module 210 fitted in opening part 310 towards the opening. Further, the operation of this ejecting tongue part 380 is the same as the operation of ejecting tongue part 180 of Embodiment 1, and description will be omitted.

Skirt parts 370 of arm parts 362, and, for example, arm parts 362 and cover top plane part 363 form cover member 360 which is electrically conductive. Further, elements in cover member 360 conduct with each other.

Furthermore, skirt parts 370 are the same as skirt parts 170 of Embodiment 1. That is, when cover member 360 is closed with respect to connector body 330, skirt parts 370 cover contact lead parts 120b from above. By contrast with this, when cover member 360 is rotated in the opening direction with respect to connector body 330 and is made open, skirt parts 370 cancel the state where contact lead parts 120b provided in connector body 330 are covered from above.

As shown in FIG. 10, when cover member 360 is closed with respect to contact body 330, skirt parts 370 are located close directly above contact lead parts 120b, and contact lead parts 120b cannot be seen when viewed from above and are completely covered.

Next, the method of connecting electronic component connector 300 and the module with the optical waveguide will be described.

First, cover member 360 of electronic component connector 300 is opened (see FIG. 8), and module 210, with which optical waveguide 200 is connected from the upside of connector body 330 to trench-shaped opening part 310 of connector body 330 exposed upward, is inserted from the front plane of module 210, that is, from the substrate side (FIG. 9).

When cover member 360 is open, the rotation position of cover member 360 is limited by stopper part 143 in a state where cover member 360 opens 90 degrees or greater with respect to connector body 330. Consequently, when module 210 is inserted to opening part 310, cover member 360 is prevented from opening too much and falling over such that the back side is directed upward to contact other electronic components.

In connector body 330, contact parts 120a are fit sandwiching module 210 inside opening part 310 and reliably contacted with connection terminal parts 215 of module 210.

After module 210 is fitted in opening part 310 of connector body 330, cover member 360 is closed, cover top plane part 363 is located above housing 132, and projecting parts 134e of shield case 334 are engaged with engagement holes 366 of cover member 360, and thereby cover member 360 is fixed to connector body 330.

Further, similar to Embodiment 1, module 210 may be fitted in opening part 310 by tentatively inserting module 210 to opening part 310, closing cover member 360 and thereby pressing against cover member 360.

Cover member 360 is thus placed in a closed state, that is, in a collapsed state, with respect to connector body 330, so as to cover member 360, and thereby module 210 is accommodated inside electronic component connector 300.

At this time, similar to pressing plate part 169, pressing plate part 369 shown in FIG. 9 presses against module 210 inside opening part 310.

The back plane of module 210 is pressed by limbs 368a and 368b. Consequently, module 210 is prevented from moving in the direction away from opening part 310, that is, away from connector body 330, and is accommodated in opening part 310 virtually horizontally without tilting in the longitudinal direction.

Accordingly, only by closing cover member 360, module 210 is reliably fixed electrically connected in the part contacting connector body 330 without touching or retaining optical waveguide 200. Consequently, it is possible to provide the same effect as electronic component connector 100.

Similar to electronic component connector 100, in a state where module 210 is installed in electronic component connector 300, module cover 214 conducts with shield case 334 of connector body 330 through cover member 360. Further, connector body 330 is jointed to the GND land part of the substrate on which connector body 330 is mounted through lead parts 134c of shield case 334 and thereby is mounted on the substrate.

By this means, similar to electronic component connector 100, when module 210 connected with electronic component connector 300 is operated, noise that is generated by the operation of module 210 is absorbed by module cover 214 and transmitted to the ground part of the substrate through cover member 360 and shield case 334. Consequently, noise leakage during the operation of module 210 can be prevented.

At this time, it is not necessary to additionally provide noise-prevention wiring required to prevent noise leakage during the operation of module 210, so that noise leakage can be prevented only by mounting the connector body on the substrate by fixing lead parts 134c of shield case 334 being connected with the ground part.

Further, according to the configuration of electronic component connector 300, planar suctioned plane part (suctioned plane) 360 equal to or wider than the size of the opening of the suction nozzle of the mounter is provided in the center portion of the top plane of cover top plane part 363.

By this means, when electronic component connector 300 itself is mounted on the substrate, suctioned plane part 364 is suctioned closely attached to the suction nozzle of the mounter, and can be retained by the suction nozzle without drifting with respect to the suction nozzle to which the suctioned plane part is suctioned.

Consequently, electronic component connector 300 itself can be moved to and mounted in a desired position on the substrate in a reliable manner. That is, troubles in mounting by the mounter can be reduced.

Particularly, if the size of the suction nozzle used to mount electronic component connector 300 is limited accompanying the miniaturization of module 210 and electronic component connector 300, electronic component connector 300 is desirably mounted while reducing the troubles in mounting.

Further, when electronic component connector 300 is mounted on the substrate, first, cover member 360 is closed with respect to connector body 330 and engagement holes 366 of cover member 360 and locking parts 134e of connector body 330 are engaged, and then electronic component connector 300 can be suctioned closely attaching the suction nozzle to suctioned plane part 364. Consequently, when electronic component connector 300 is mounted, electronic component connector 300 suctioned and reliably retained by the suction nozzle can be moved horizontally and can be moved to the mounting position at ease through the suction nozzle.

Lead parts 134c of electronic component connector 300 moved to the mounting position are fixed to the substrate. Further, similar to electronic component connector 100, in electronic component connector 300, skirt parts 170 are located close directly above contact lead parts 120b of connector body 330.

Therefore, when contact lead parts 120b are jointed to the pat of the substrate, by falling cover member 360 over connector body 330 in the opening direction, opening part 310 of connector body 330 is placed in an open state.

Consequently, contact lead parts 120b of connector body 330 can be exposed to the outside, particularly, upward, and therefore jointed to the pat of the substrate at ease.

When module 210 is connected after connector body 330 is mounted, that is, when module 210 of connector body 330 is covered by cover member 160, contact lead parts 120b projecting to the left and right from the lateral sides of connector body 330 are covered from above by skirt parts 370 that are electronically conductive members and located in the closest positions.

In this configuration, even when high-speed signals flow into contact lead parts 120b during the operation of module 210 and noise is emitted from contact lead parts 120b, the noise is absorbed by skirt parts 370 located close directly above contact lead parts 120b. At this point, when viewed from above, contact lead parts 120b are covered by skirt parts 370 and cannot be seen, and are completely covered from above.

That is, skirt parts 370 are provided in cover member 360, and so are grounded to the GND land in the mounting substrate through cover member 360 and lead parts 134c of shield case 334 of connector body 330.

Consequently, in electronic component connector 300, even when high-speed signals flow into contact lead parts 120b connected with the mounting substrate and noise is emitted from contact lead parts 120b, the noise is grounded to the GND land in the substrate through skirt parts 370. Consequently, noise emitted from contact lead parts 120b is absorbed, and shielded and reduced by skirt parts 370.

That is, skirt parts 370 can thereby prevent electromagnetic interference (EMI) due to the emission and propagation of electromagnetic noise (i.e. electromagnetic waves) leaking from contact lead parts 120b In electronic component connector 300, the periphery and the entire top plane of resin housing 132 accommodating module 210 are covered by shield case 334 and cover member 360, respectively. In other words, cover top plane part 363 of cover member 360 entirely covers from above module 210 and the portion exposing the top plane of housing 132 that is made of a resin, that is, that has insulating properties, and that accommodates module 210.

Further, contact lead parts 120b exposing to the outside are covered by skirt parts 370

That is, almost the entire periphery of module 210 connected electrically inside electronic component connector 300 is covered by electrically conductive members.

Particularly, the top plane of module 210 is entirely covered by cover top plane part 363 and is shielded.

Consequently, electronic component connector 300, with which module 210 is connected, makes it possible to prevent, for example, EMI as much as possible.

In this way, electronic component connector 300 of Embodiment 2 makes it possible to prevent, for example, EMI as much as possible, and, when mounted on the substrate, is reliably suctioned by the suction nozzle of the mounter through suctioned plane 364. Consequently, electronic component connector 300 can be retained reliably in the mounter, reliably moved with the substrate to the mounter and located in a desired position, and problems in mounting by the mounter can be reduced. By pressing against module 210 toward the bottom plane of opening part 310 by pressing plate part 369 and limbs 368a and 368b, connection terminal parts 215 of module 210 can be connected reliably with socket contact parts 120.

When electronic component connector 300 is mounted, it is possible to expose upward contact lead parts 120b with the upside covered by skirt parts 370 upon use by opening member 360 and facilitate the mounting operation.

In electronic component connector 300 accommodating module 210, when module 210 is removed by ejecting tongue part 380, module 210 can be detached from electronic component connector 300 without ejecting jigs only by rotating cover member 360 in the opening direction.

Embodiment 3

Figure 11:
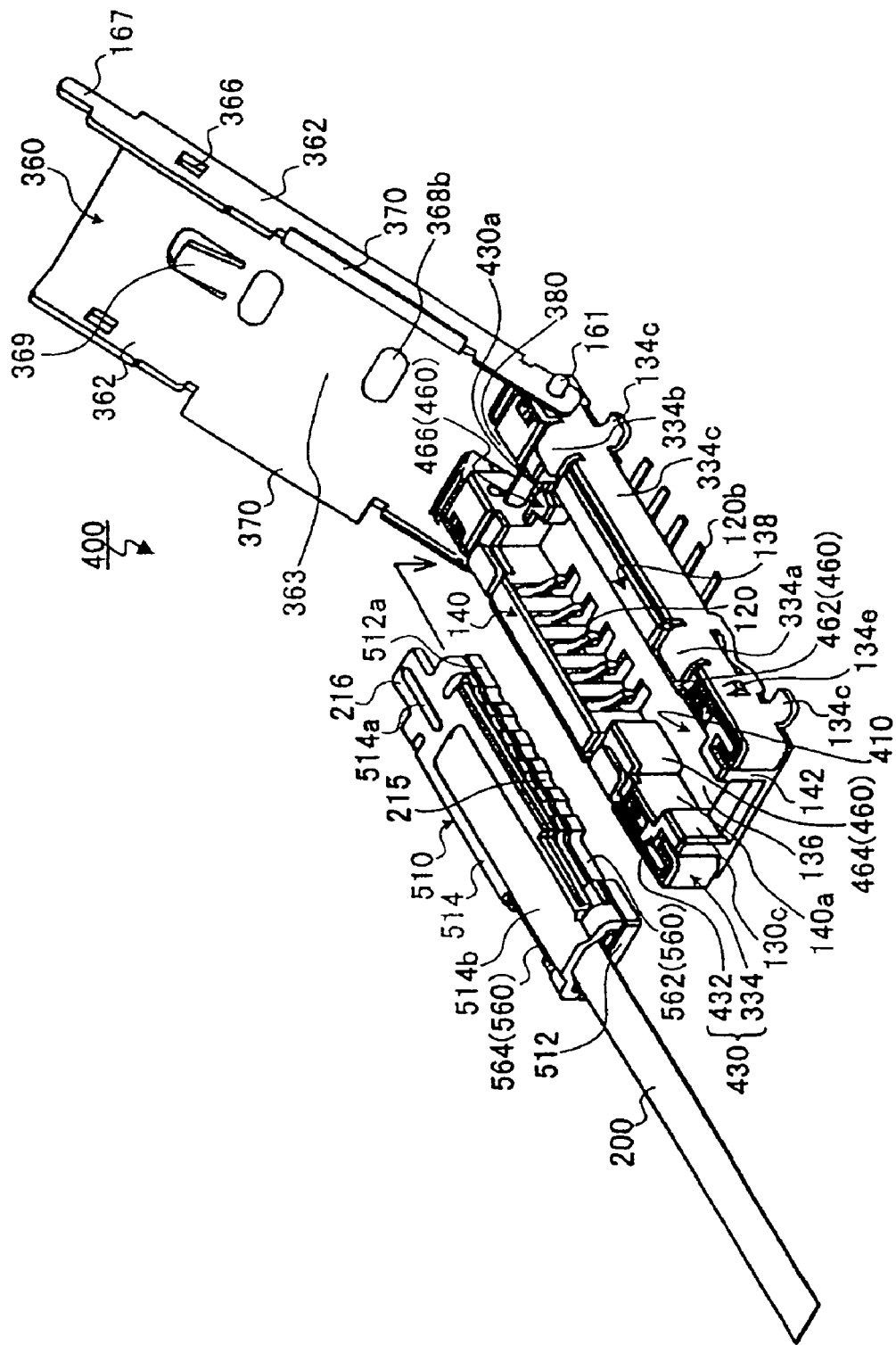
FIG. 11 shows the configuration of the electronic component connector according to Embodiment 3 of the present invention.
Figure 12:
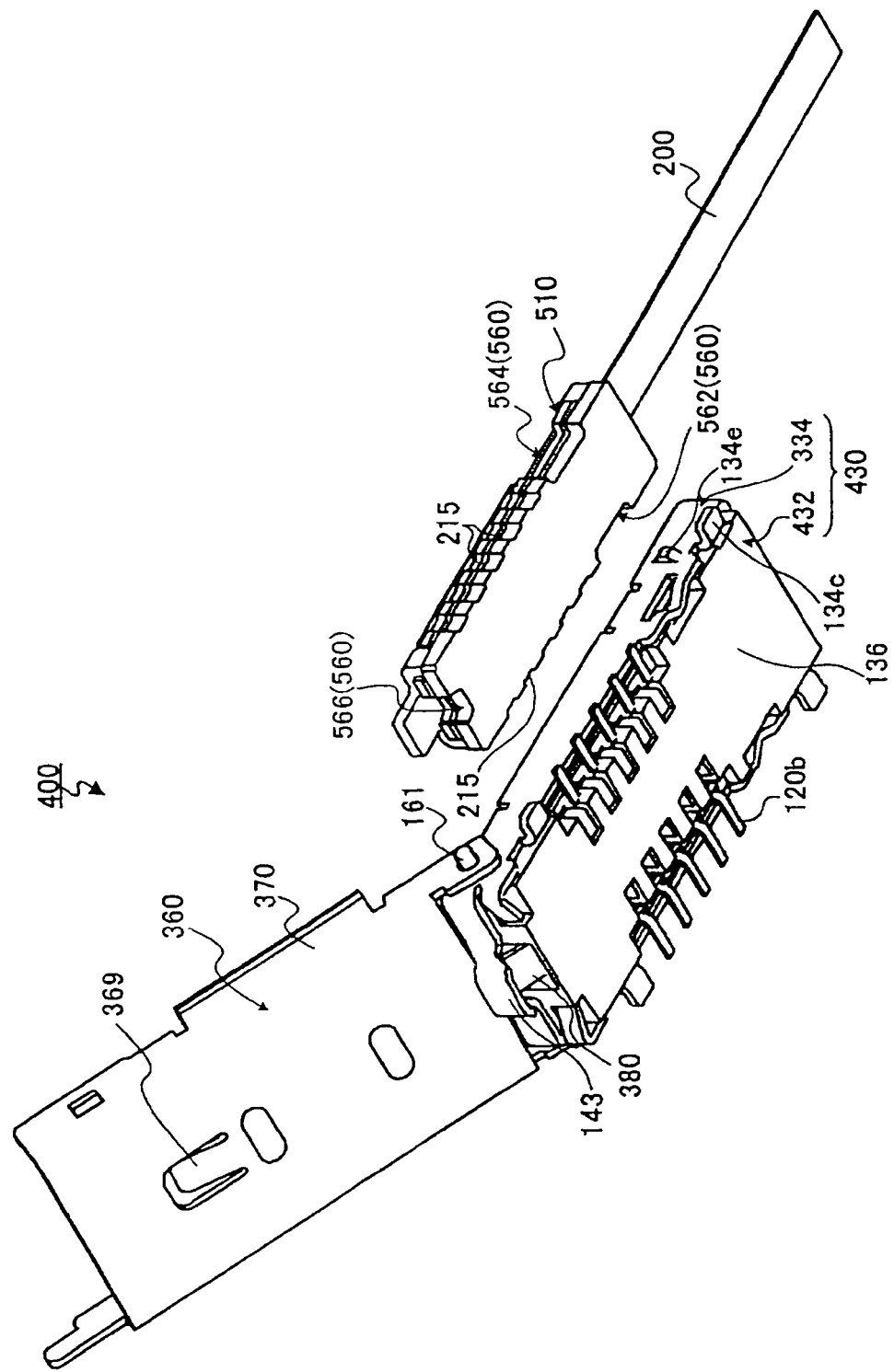
FIG. 12 shows the configuration of the electronic component connector according to Embodiment 3 of the present invention.

FIG. 11 shows configurations of an electronic component connector and electronic component to be accommodated in the connector according to Embodiment 3 of the present invention, and FIG. 12 is a perspective view showing the electronic component connector and electronic component from the back.

Electronic component connector 400 of Embodiment 3 differs from the configuration of electronic component connector 300 having the same basic configuration as electronic component connector 100, in increasing the number of socket contact parts (i.e. contact terminals) and having positioning projecting parts 460 (462, 464 and 466), and the rest of configurations are the same. Therefore, different components will be described below and the same components as electronic component connector 300 will be assigned the same names and same reference numerals, and description thereof will be omitted.

This electronic component connector 400 accommodates module 510, which is an electronic component, inside opening part 310 of connector body 430 and electrically connects with connection terminal parts 215 of module 510 through socket contact parts 120.

Similar to module 210, module 510 to be accommodated in electronic component connector 400 is an electronic component to which optical waveguide 200 is attached. Module 510 employs the same basic configuration as module 210 installed in electronic component connector 100 of Embodiment 1, and is inserted to opening part 410 of electronic component connector 400 and is detachably fitted in electronic component connector 400. By this means, connection terminal parts 215 of module 410 (see FIG. 11) are connected with socket contact parts (i.e. contact terminals) of electronic component connector 400.

This module 510 differs from module 210 which is accommodated by electronic component connectors 100 and 300 and to which optical waveguide 200 is attached, in the number of connection terminal parts 215 corresponding to socket contact parts 120 and positioning trench parts 560 (562, 564 and 566), and the rest of configurations are the same.

Similar to Embodiment 2, with Embodiment 3, the plane of the electronic component connector 400 that is mounted on the substrate is the bottom plane, and the direction in which optical waveguide 200 is attached to module 510 is the distal end direction.

First, module 510 with optical waveguide 200 accommodated by electronic component connector 400 will be described.

Module 510 has a rectangular parallelepiped shape here (to be more specific, a plate shape) and optical waveguide 200 is attached extending in the longitudinal direction of module 510 from one end plane.

Module 510 is provided with more connection terminal parts 215 than module 210 in the both side planes extending in the longitudinal direction and has positioning trench parts 562 and 564 in which notches are made sideways and in the up and down direction, in the distal end part beyond the position for locating connection terminal parts 215. Further, in the proximal end plane, module 510 has proximal end positioning trench part 566 in which a notch is made sideways and in the up and down direction. The width of module 510 and the distance in the bottom plane between positioning trench parts 562 and 564 are longer than the width of optical waveguide 200 formed in a film shape.

Module 510 differs from module 210 in having positioning trench parts 562 and 564 and proximal end positioning trench part 566 and in that the number of arranged connection terminal parts 215 increases, and the rest of the basic configurations are the same.

That is, module 510 has: substrate 512 on which an optical signal processing (not shown) to which one end of optical waveguide 200 is jointed and which carries out optical signal processing through optical waveguide 200; and a module cover (i.e. exterior part 514) that covers the optical signal processing section (i.e. electronic component body) on substrate 512. Further, the optical signal processing section is the same as the optical signal processing section of module 210 and has the same function and effect, and so description thereof will be omitted.

In substrate 512 of module 510, connection terminal parts (i.e. electrode parts) 215 that output voltages (i.e. electrical signals) converted by the optical signal processing section are located in both side planes 512*a* adjacent to the mounting plane (not shown) and extending in the direction in which optical waveguide 200 extends. These connection terminal parts 215 are provided so as to be exposed from both side planes 512*a*, and, when the mounting plane of substrate 212 is the back plane (corresponding to the top plane in FIG. 11) in this arrangement, are located in a plurality of concave parts that are formed in side planes 512*a* so as to open to the front plane (corresponding to the bottom plane in FIG. 12) and the side planes of module 510.

When these concave parts are formed orthogonal with respect to the plane portion of film-shaped optical waveguide 200 and are electrically contacted with electronic component connector 400, module 510 is connected by inserting module 510 from the front plane. In other words, module 410*c* is connected by inserting module 510 from above in a virtually vertical direction with respect to electronic component connector 500.

Further, concave parts of substrate 512 communicate with concave parts formed in the side planes of module cover 514 in the up and down direction, and connection terminal parts 215 are thereby configured to be provided in concave parts opening in the up and down direction and sideways in the side planes of module 510. Some of configurations and functions of module cover 514 are the same as module 214 and absorb noise generated upon the operation of the optical signal processing section.

Module cover 514 has retaining tab part 216 formed likewise as in module 214. The function of this retaining tab part 216 is the same as in module cover 214 of module 210, and description thereof will be omitted. In the top plane portion of this module cover 514, ridge reinforcing roof part 514*a* projecting upward across the top portion of retaining tab part 216 from the body portion of module cover 514 and retaining tab part 216 overhanging in the proximal end is reinforced by this reinforcing roof part 514*a* for increased strength.

Further, roof part 514*b* projecting upward and extending in the longitudinal direction is also formed in the center portion of the top plane part of module cover 214. Further, this roof part 514*b* is a portion to be pressed by ejecting tongue part 369 of cover member 360 when module 510 is inserted to opening part 410 and cover member 360 is closed.

Module 510 configured in this way is fitted in opening part 410 of electronic component connector 400 that opens upward, and thereby connection terminal parts 215 are connected with socket contact parts (i.e. contact terminals) 120 of electronic component connector 400.

Electronic component connector 400 shields and protects module 510 accommodated in opening part 410 from electric fields and magnetic fields from the outside by covering module 510 by cover member 360 that is pivotally mounted in connector body 430 openably and closably.

In electric component connector 400 shown in FIG. 11, cover member 360 having skirt parts 370 of the same function as skirt parts 170 is rotatably and pivotally mounted in connector body 430 having opening part 410 in which module 510 is fitted.

Module 510 is inserted to opening part 310 and fitted in connector body 330 inside opening part 310 and is covered by this cover member 360 (see FIG. 9).

As shown in FIG. 11, connector body 430 has the same basic configuration as connector body 330, and has housing (housing part) 432 that has opening part 410, and shield case (shield part) 334 which is located in the periphery of housing 432 and which shields module 510 that is fitted in opening part 410.

Housing 432 has positioning projecting parts 460 (462, 464 and 466) in addition to the configuration of housing 132 of electronic component connector 300.

To be more specific, in housing 432 of connector body 430, positioning projecting parts 462 and 464 are provided in opposing planes (only opposing plane 140a is shown in FIG. 11) of a pair of opposing sidewall parts 138 and 140 provided upright along the both side edges of bottom plane part 136.

Positioning projecting parts 462 and 464 project from the opposing planes (only opposing plane 140a is shown in this figure) toward the opposing direction. Positioning projecting parts 462 and 464 form ridges extending in the insertion direction and exposing the top planes upward. These positioning projecting parts 462 and 464 fit module 510 in positioning trench parts 562 and 564 of module 510 fitted in opening part 410.

Between proximal end parts of a pair of sidewall parts 138 and 140 forming the proximal end part of connector body 430, waist wall part 430a which has an inner wall plane opposing the rear end plane of module 510 to be accommodated in opening part 410 and which is lower than a pair of sidewall parts. In waist wall part 430a, proximal end positioning projecting part 466 which projects from the inner wall plane toward the distal end, which extends in the insertion direction on bottom plane part 136 and which exposes the top plane upward.

Similar to positioning projecting parts 462 and 464 fitted in positioning trench parts 562 and 564 of module 510, this proximal end positioning projecting part 466 is fitted in proximal end positioning trench part 566 of module 510 fitted in opening part 410.

Front wall part 142 in which lead-out path 130c is formed is provided between the distal end parts of a pair of these sidewall parts 138 and 140, and stopper part 143 (see FIG. 12) is bridged between the proximal end parts.

In a pair of sidewall parts 138 and 140, opposing planes (only opposing plane 140a is shown in FIG. 11) in which positioning projecting parts 462 and 464 are formed, bottom plane part 136 and front wall part 142 make opening part 410 communicate with lead-out pat 130c in the distal end and form opening part 410 in a trench shape opening upward.

The opposing planes of a pair of sidewall parts 138 and 140 (only opposing plane 140a is shown in FIG. 11), that is, opposing inner wall planes of opening part 410, are provided with socket contact parts (i.e. contact terminals) 120 similar to electronic component connector 300.

Attachment of socket contact parts 120 to housing 432 and connection of socket contact parts 120 with connection terminal parts 215 of module 510 in electronic component connector 400 are the same as in electronic component connectors 100 and 300, and description thereof will be omitted.

Similar to electronic component connector 300, a communicating groove that communicates with connector body 430 in the distal end is formed in front wall part 142, and lead-out path 130c of a lead-out part for leading optical waveguide 200 (see FIG. 11) of module 510 (see FIG. 11) to the outside in the distal end is formed by this communicating groove.

Shield case 334 covering housing 432 configured in this way has the same components as shield case 334 of electronic component connector 300 and functions of these components, and description thereof will be omitted.

Stopper part 143 and cover member 360 in the proximal end of this connector body 430 are the same as stopper part 143 and cover member 360 of electronic component connector 300, and so has the same function and effect and description thereof will be omitted.

When module 510 with optical waveguide 200 is connected with electronic component connector 400 configured in this way, first, cover member 360 of electronic component connector 400 is opened. When cover member 360 is open, the rotation position of cover member 360 is limited by stopper part 143 in a state where cover member 360 opens 90 degrees or greater with respect to connector body 330. Consequently, when module 210 is inserted to opening part 310, cover member 360 is prevented from opening too much and falling over such that the back side is directed upward to contact other electronic components.

Then, module 510 with which optical waveguide is connected is inserted to trench-shaped opening part 410 of connector body 430 exposing upward from the bottom plane of module 510, that is, from substrate 512 side.

At this point, module 510 is fitted in opening part 410 by fitting positioning trench parts 562 and 564 to positioning projecting parts 462 and 464 of electronic component connector 400 and fitting proximal end positioning trench part 566 to proximal end positioning projecting part 466 of electronic component connector 400.

Then, module 510 is accommodated inside opening part 410 by fitting positioning trench parts 562 and 564 onto positioning projecting parts 462 and 464 and fitting proximal end positioning trench part 566 onto proximal end positioning projecting part 466.

In this way, in electronic component connector 400 of Embodiment 3, at least one wall part of connector body 430 partitioning opening part 410 is provided with positioning projecting parts 462 and 464 and proximal end positioning projecting part 466 that project toward opening part 410 and that are fitted in positioning trench parts 562 and 564 and proximal end positioning trench part 566 formed in the outer periphery along the insertion direction of module 510 to be accommodated in opening part 410. By this means, positioning projecting parts 462 and 464 and proximal end positioning projecting part 466 are fitted in positioning trench parts 562 and 564 and proximal end positioning trench part 566, respectively, so that connector body 430 is configured to accommodate only module 510 in opening part 410.

Consequently, electronic component connector 400 makes it possible to insert module 510 to opening part 410 by fitting positioning trench parts 562 and 564 and proximal end positioning trench part 566 onto positioning projecting parts 462 and 464 and proximal end positioning projecting part 466, respectively.

In this way, positioning projecting parts 462 and 464 and proximal end positioning projecting part 466 are able to adequately guide module 510 into opening part 410 to fix in a state where the position is determined precisely. That is, in electronic component connector 400, when module 510 is inserted and connected, connection terminal parts 215 of module 510 and socket contact parts 120 which match each other are not drifted and can be connected precisely.

Further, electronic component connector 400 is configured to accommodate only module 510 in opening part 410 of connector body 430 by positioning projecting parts 462 and 464 and proximal end positioning projecting part 466.

Consequently, when electronic component connector 400 and the electronic component connector having basically the same configuration as electronic component connector 400 are prepared and these electronic component connectors are connected through optical waveguides 200 of modules accommodated in the electronic component connectors and used as the transmitting side and the receiving side, only applicable modules alone will be accommodated.

To be more specific, positioning projecting part 460 in electronic component connector 400 (positioning projecting parts 462 and 464 and proximal end positioning projecting part 466) is formed in a different position from the positioning projecting part of the electronic component connector of the other party.

Figure 13:
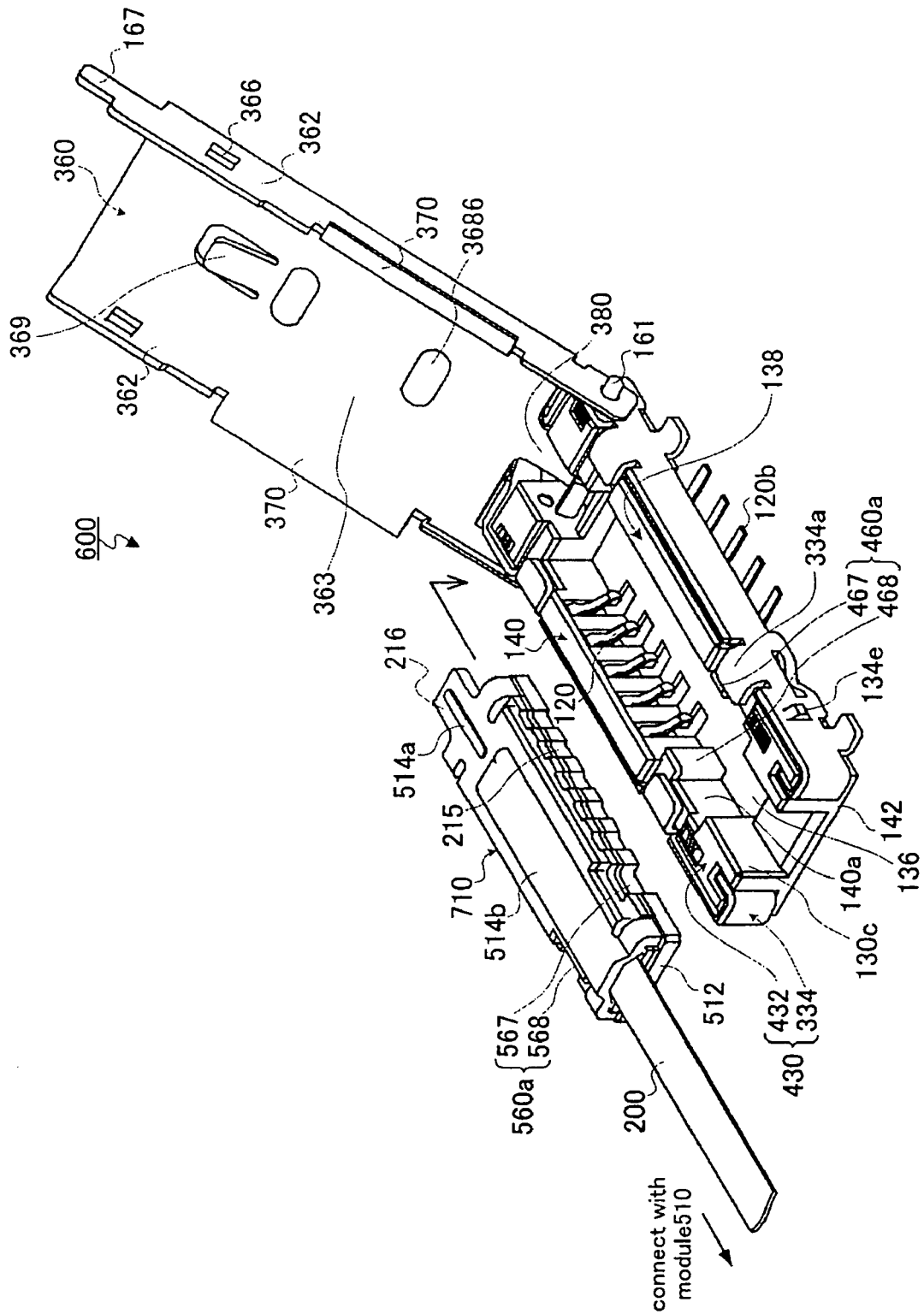
FIG. 13 shows an example of the electronic component connector which becomes a transmission party of the electronic component connector according to Embodiment 3 of the present invention.

For example, a configuration is employed where electronic component connector 400 and module 510 are used as a connector set on the transmitting side and module 700 and electronic component connector 600 shown in FIG. 13 are used as the connector set on the receiving side.

Electronic component connector 600 shown in FIG. 13 has the same basic configuration as electronic component connector 400 except the position for locating positioning projecting part 460a having the same function as positioning projecting part 460a. Further, module 710 to be accommodated in this electronic component connector 600 differs from module 510 in the position for locating positioning trench part 560, and positioning trench part 560 is formed in the position matching positioning projecting part 660.

Electronic component connector 600 and module 710 differ in the configurations of positioning projecting parts and positioning trench parts, and the other basic configurations are virtually the same as electronic component connector 400 and module 510 and the same configurations have the same function and effect as in electronic component connector 400. Therefore, only the different configurations will be described, and the same components will be assigned the same names and same reference numerals and description thereof will be omitted.

In housing 432 of connector body 430 of this electronic component connector 600, positioning projecting parts 460a (467 and 468) are provided in a pair of opposing sidewall parts 138 and 140 provided upright along the both side edges of bottom plane part 136.

Positioning projecting parts 467 and 468 of electronic component connector 600 project in the opposing planes (only opposing plane 140a is shown in FIG. 13) in a pair of sidewall parts 138 and 140 toward the opposing direction. Positioning projecting parts 467 and 468 form ridges extending in the insertion direction and exposing the top planes upward. These positioning projecting parts 467 and 468 are formed in positions drifted from positioning projecting parts 462 and 464 of electronic component connector 400 in the longitudinal direction, that is, in the front and back directions, of opening part 410 in housing 432 formed in virtually the same manner.

These positioning projecting parts 467 and 468 are fitted in positioning trench parts 567 and 568 of module 710 fitted in opening part 610.

Further, this electronic component connector 600 is different from electronic component connector 400, and the positioning projecting part corresponding to proximal end positioning projecting part 466 is not formed. By this means, a configuration is employed where the positioning trench part corresponding to proximal end positioning trench part 566 is not provided in the proximal end of module 710.

Modules 510 and 710 connected with both ends of optical waveguides 200 are accommodated in electronic component connector 400 shown in FIG. 11 and FIG. 12 and electronic component connector 600 shown in FIG. 13 configured in this way. Consequently, substrates mounting electronic component connectors 400 and 700 can be connected through optical waveguides 200.

When such a structure is assembled, positioning projecting parts 460 and 460a matching modules 510 and 710 are formed in electronic component connectors 400 and 600. Consequently, module 710 cannot be inserted and accommodated in electronic component connector 400 and module 510 cannot be inserted and accommodated in electronic component connector 700.

Consequently, when electronic component connectors 400 and 600 are used in a pair, modules 510 and 710 accommodated in the electronic component connectors, which are destinations of other parties to transmit signals through optical waveguides, can be prevented from being installed by error.

In this way, in electronic component connector 400 of the present embodiment, positioning projecting parts 462 and 464 and proximal end positioning projecting part 466 are formed in different positions from positioning projecting parts 467 and 468 of another electronic component connector 700 of the transmitting party side of electronic component connector 400.

In other words, in electronic component connector 400, positioning projecting parts 462 and 464 form different opening shapes from another electronic component connector 600 which employs the same basic configuration as electronic component connector 400 and which is used in a pair with electronic component connector 400.

That is, in electronic component connector 400, optical waveguide (i.e. transmitting member) 200 for signals extend in one side plane of module 510 and optical waveguide 200 is connected with another module 710 at the end of extension. Connector body 430 of electronic component connector 400 is formed in communication with opening part 410 and has front wall part (i.e. lead-out part) 142 in which lead-out path 130c for leading optical waveguide 200 extended from module 510 accommodated in opening part 410, to the outside. Positioning projecting parts 462 and 464 and proximal end positioning projecting part 466 are formed so as to accommodate only module 510 in opening part 430 of connector body 430.

Consequently, electronic component connector 400 makes it possible to prevent modules (module 710 in this case) other than applicable module 510 from being installed by error.

Although a configuration is employed with the present embodiment where positioning projecting parts fitted in positioning trench parts formed along the insertion direction of module 510 accommodated in opening part 410 are provided in opposing planes 140a and waist wall part 430a, the present invention is not limited to this and positioning projecting parts may be provided in any positions as long as at least one of them project toward opening part 410 from the wall part of connector body 430 partitioning opening part 410 and is fitted in a positioning trench part of module 510.

For example, in a configuration of electronic component connector 400, a configuration is possible where proximal end positioning projecting part 466 is not provided and positioning projecting parts 462 and 464 are provided in opposing planes (only opposing plane 140a is shown in FIG. 11) of a pair of sidewall parts 138 and 140. Further, a configuration is also possible where a positioning projecting part is provided only in one plane of the opposing planes in the inner planes accommodating the module and partitioning the opening part. It naturally follows that, in any configuration, the positioning projecting part formed in a wall plane partitioning the opening part of the electronic component connector matches the positioning trench part of module 510 to be accommodated in the opening part.

The effect by other components in electronic component connector 400 is the same as the effect by the same components as in electronic component connector 300, and description thereof will be omitted.

According to the present embodiment, an electronic component connector includes: a connector body that is connected electrically with an accommodated electronic component and that is mounted on a substrate; a lead terminal part that is located in the connector body to lead out sideways of the connector body and that is jointed to a conductor on the substrate; a cover part that is electrically conductive and that covers the connector body from above; and a terminal cover part that is electrically conductive, that is provided in the cover part and that covers the lead terminal part jointed to the conductor from above. By this means, lead terminal parts jointed to a conductor are covered from above by electrical conductive terminal cover parts. In this way, the operation frequency of signals flowing into the lead terminal parts increases and, even when electro magnetic noise, which becomes electro magnetic interference, is generated, electro magnetic noise can be absorbed by the terminal cover parts.

Consequently, when an electronic component is connected with a substrate through a connector and driven, it is possible to reduce noise emission.

Further, according to the present embodiment, the electronic component may be accommodated in an opening part formed opening upward in the connector body; the cover part may cover the opening part by covering the connector body from above; and, when the cover part is attached to the connector body and covers the opening part, the terminal cover part may be provided in the cover part in a portion where the terminal cover part is located above the lead terminal part and is closely located along the lead terminal part. By this means, the terminal cover parts are closely located along lead terminal parts, so that the terminal cover parts can efficiently absorb noise generated by the lead terminal parts and reduce noise emission from the lead terminal parts.

Further, according to the present embodiment, it is desirable that the cover part is pivotally mounted openably and closably over the connector body; and the terminal cover part moves away from the lead terminal part accompanying rotation of the cover part in an opening direction. By this means, it is possible to cancel the state in which the lead terminal parts are covered by the terminal cover parts, by opening and closing the cover part.

That is, when the cover part is open, the lead terminal parts are exposed upward, so that, when the connector body is mounted on the substrate, it is possible to open the cover part with respect to the connector body and joint the lead terminal parts to the conductor of the substrate. By jointing the lead terminal parts to the conductor of the substrate to mount the electronic component connector on the substrate, and then accommodating the electronic component and closing the cover, the terminal cover parts can cover the lead terminal parts in the electronic component connector with which the electronic component is connected.

Further, according to the present embodiment, it is desirable that the terminal cover part is in a horizontal plate shape located horizontally on the top plane of the lead terminal part. Further, according to the present embodiment, it is desirable that, when the connector body is covered by the cover part, the terminal cover part covers the lead terminal part entirely. Furthermore, according to the present embodiment, it is desirable that the cover part includes a suctioned plane part equal to or wider than the size of the opening of a suction nozzle of a mounter.

By this means, a suctioned plane is provided in the center portion of the top plane of the cover member, so that the center portion of the top plane of the cover member can be suctioned in close attachment by suctioning the suctioned plane by a suction nozzle of a mounter. Consequently, when mounted on the substrate using the mounter, the cover member is retained by the suction nozzle without being drifted from the suction nozzle, and can be moved reliably to a desired position on the substrate and mounted. That is, troubles in mounting by the mounter can be reduced.

Further, according to the present embodiment, it is desirable that the cover part includes an engaged part detachably engaged with an engaging part of the connector body when the connector body is covered. By this means, when an electronic component connector is mounted on a substrate, the engaging part and the engaged part can be engaged, so that, after they are engaged, the electronic component connector can be mounted by suctioning the suctioned plane by the suction nozzle of the mounter. Consequently, the cover part and the connector body covered by the cover part can be moved integrally, so that, when the cover part is attached detachably to the connector body, it is possible to facilitate the mounting operation.

Further, it is desirable that the cover part includes a pressing part that is electrically conductive and that, when the cover part covers the opening part, presses against the electronic component to be accommodated in the opening part and holds a state in which the electronic component and the connector body are connected. By this means, when a connector body is covered by a cover part, an electronic component accommodated in the opening part and the connector body can be connected reliably, and a static charge that is charged in the electronic component and electro magnetic noise generated upon the operation of the electronic component can be absorbed by the cover part and reduced. Consequently, when the electronic component is connected with the substrate through the connector and driven, it is possible to reduce noise emission.

Further, it is desirable that the cover part includes a limb that is provided projecting downward from an interior plane and that limits a position of a top plane of the electronic component to be accommodated in the opening part. By this means, the electronic component can be located in a desirable accommodation position in an opening part.

Although the module connected with electronic component connector 100 has been described with the present embodiment as the module with an optical waveguide, the present invention is not limited to this. The present invention may be applied to a module (i.e. electronic component) that does not have an optical waveguide and that converts optical signals into electrical signals. Further, the present invention may be a connector to which a module carrying out signal processing through a transmitting member transmitting electrical signals such as a module (i.e. electronic component) carrying out signal processing of a transmitting member other than an optical waveguide such as an electric wire, cable or flexible cable transmitting electrical signals.

The disclosures of Japanese Patent Application No. 2006-209182, filed on Jul. 31, 2006, Japanese Patent Application No. 2006-322355, filed on Nov. 29, 2006, and PCT Application No. PCT/JP2007/057212, filed on Mar. 30, 2007, including the specifications, drawings and abstracts, are incorporated herein by reference in their entirety.

INDUSTRIAL APPLICABILITY

The electronic component connector according to the present invention provides an effect of emitting little noise when an electronic component is connected with a substrate through a connector and driven, and is useful for an electronic component connector having a transmitting member that is miniaturized and that is capable of a great amount of signal transmission.

What is claimed is:

1. An electronic component connector comprising:
    a rectangular connector body that accommodates an electronic component in which an optical waveguide extends from one side plane, in a state where the optical waveguide is extended to an outside from a front substantially horizontally, to electrically connect with the electronic component, and that is mounted on a substrate;
    lead terminal parts that is lead out from both sides of the connector body and are located in the connector body such that a plurality of the lead terminal parts are aligned only along a direction in which the optical waveguide extends, and that is jointed to a conductor on the substrate;
    an electrically conductive cover part that is openably and closably mounted to pivot about a horizontal axis which is orthogonal to the optical waveguide on a rear end part side of the connector body, and that covers the connector body from above in a state where the optical waveguide is extended from the front when the cover part is closed; and
    an electrically conductive terminal cover part that is provided in the cover part and that covers an entire top plane of the lead terminal parts from above and moves away from the lead terminal parts following rotation of the cover part in an opening direction,
    wherein the terminal cover part is arranged horizontally directly above the lead terminal parts when the cover part is closed, and comprises a horizontal plate shape extending in the direction in which the optical waveguide extends.

2. The electronic component connector according to claim 1, wherein:
    the electronic component is accommodated in an opening part formed opening upward in the connector body;
    the cover part covers the opening part by covering the connector body from above; and
    when the cover part is attached to the connector body and covers the opening part, the terminal cover part is provided in the cover part in a portion where the terminal cover part is located above the lead terminal parts and is closely located along the lead terminal parts.

3. The electronic component connector according to claim 1, wherein the cover part comprises a suctioned plane part equal to or wider than the size of the opening of a suction nozzle of a mounter.

4. The electronic component connector according to claim 3, wherein the cover part comprises an engaged part detachably engaged with an engaging part of the connector body when the connector body is covered.

5. The electronic component connector according to claim 2, wherein the cover part comprises a pressing part that is electrically conductive and that, when the cover part covers the opening part, presses against the electronic component to be accommodated in the opening part and holds a state in which the electronic component and the connector body are connected.

6. The electronic component connector according to claim 2, wherein the cover part comprises a limb that is provided projecting downward from an interior plane and that limits a position of a top plane of the electronic component to be accommodated in the opening part.

7. The electronic component connector according to claim 2, wherein:
    at least one of wall parts of the connector body partitioning the opening part is provided with a projecting part that projects toward the opening part and that fits in a trench part formed in an outer periphery along an insertion direction in the electronic component to be accommodated in the opening part; and
    after fitting of the projecting part in the trench part, the connector body accommodates only the electronic component in the opening part.

* * * * *

UNITED STATES PATENT AND TRADEMARK OFFICE
CERTIFICATE OF CORRECTION

| | | |
|---|---|---|
| PATENT NO. | : 7,833,042 B2 | Page 1 of 1 |
| APPLICATION NO. | : 12/309833 | |
| DATED | : November 16, 2010 | |
| INVENTOR(S) | : Atsushi Nishio et al. | |

It is certified that error appears in the above-identified patent and that said Letters Patent is hereby corrected as shown below:

Column 29, Claim 1, Line 21
Please delete "lead terminal parts that is lead" and replace with -- lead terminal parts that lead --

Signed and Sealed this
Eighteenth Day of January, 2011

David J. Kappos
*Director of the United States Patent and Trademark Office*

UNITED STATES PATENT AND TRADEMARK OFFICE
CERTIFICATE OF CORRECTION

PATENT NO. : 7,833,042 B2
APPLICATION NO. : 12/309833
DATED : November 16, 2010
INVENTOR(S) : Atsushi Nishio et al.

Page 1 of 1

It is certified that error appears in the above-identified patent and that said Letters Patent is hereby corrected as shown below:

Please correct the following on the front page of the patent:

Please delete:
"(87) PCT Pub. No.:    WO2008/015862

PCT Pub. Date:    Jul. 2, 2008"

and replace with:
(87) PCT Pub. No.:    WO2008/015862

PCT Pub. Date:    Feb. 7, 2008

Signed and Sealed this
Twenty-ninth Day of March, 2011

David J. Kappos
*Director of the United States Patent and Trademark Office*